(12) United States Patent
Furuya

(10) Patent No.: US 9,606,333 B2
(45) Date of Patent: Mar. 28, 2017

(54) RELAY OPTICAL SYSTEM AND MICROSCOPE APPARATUS

(71) Applicant: OLYMPUS CORPORATION, Shibuya-ku, Tokyo (JP)

(72) Inventor: Yo Furuya, Kamiina (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/012,390

(22) Filed: Feb. 1, 2016

(65) Prior Publication Data
US 2016/0231541 A1    Aug. 11, 2016

(30) Foreign Application Priority Data
Feb. 10, 2015    (JP) ................. 2015-024563

(51) Int. Cl.
*G02B 23/24*    (2006.01)
*G02B 13/00*    (2006.01)
*G02B 21/02*    (2006.01)

(52) U.S. Cl.
CPC ......... *G02B 13/0095* (2013.01); *G02B 21/02* (2013.01)

(58) Field of Classification Search
CPC .... G02B 13/16; G02B 13/0095; G02B 13/06; G02B 13/22; G02B 17/08
USPC .................................... 359/368, 754, 434
See application file for complete search history.

(56) References Cited

U.S. PATENT DOCUMENTS

| 5,808,791 | A | 9/1998 | Kawano et al. |
| 6,323,998 | B1 | 11/2001 | Kawano et al. |
| 7,952,800 | B2 * | 5/2011 | Nakayama ........... G02B 21/025 359/434 |

FOREIGN PATENT DOCUMENTS

| JP | 08015612 A | 1/1996 |
| JP | 2009122624 A | 6/2009 |

* cited by examiner

*Primary Examiner* — Bumsuk Won
*Assistant Examiner* — Tamara Y Washington
(74) *Attorney, Agent, or Firm* — Holtz, Holtz & Volek PC

(57) ABSTRACT

A relay optics includes a positive first lens group, a positive second lens group, and a positive third lens group. The second lens group includes, closest to the object, a lens having the concave surface facing toward the object. The relay optics is configured in such a manner that a light flux passing between the second and third lens groups is a substantially-parallel light flux, and satisfies condition expressions below, where $f_1$ represents the focal length of the first lens group, $d_1$ represents the length from the primary image to a surface closest to the object in the first lens group, $f_{12}$ represents the combined focal length of the first and second lens groups, and $\exp_{12}$ represents the length from an exit pupil position of an optics consisting of the first and second lens groups to a surface closest to the object in the second lens group:

$1 \le f_1/d_1 \le 4.3$ $0.16 \le \exp_{12}/f_{12} \le 1.2$.

10 Claims, 17 Drawing Sheets

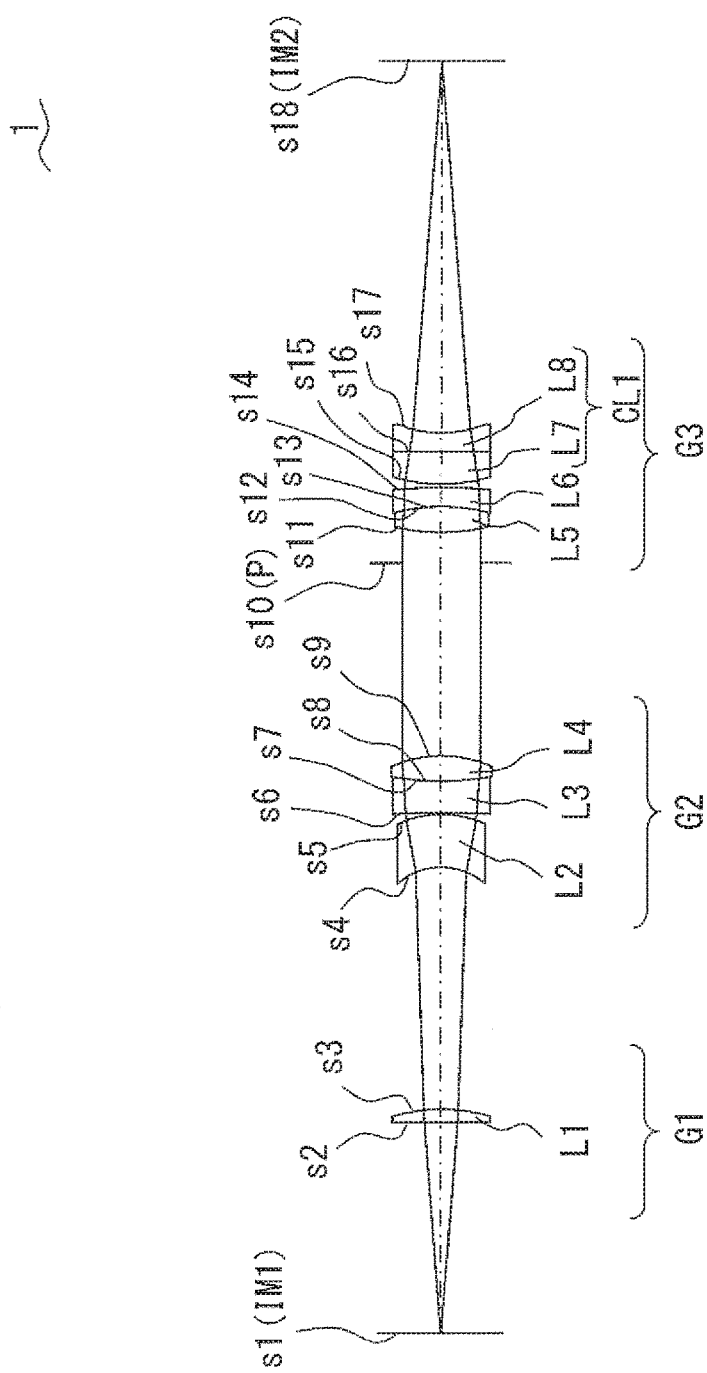
F I G. 1

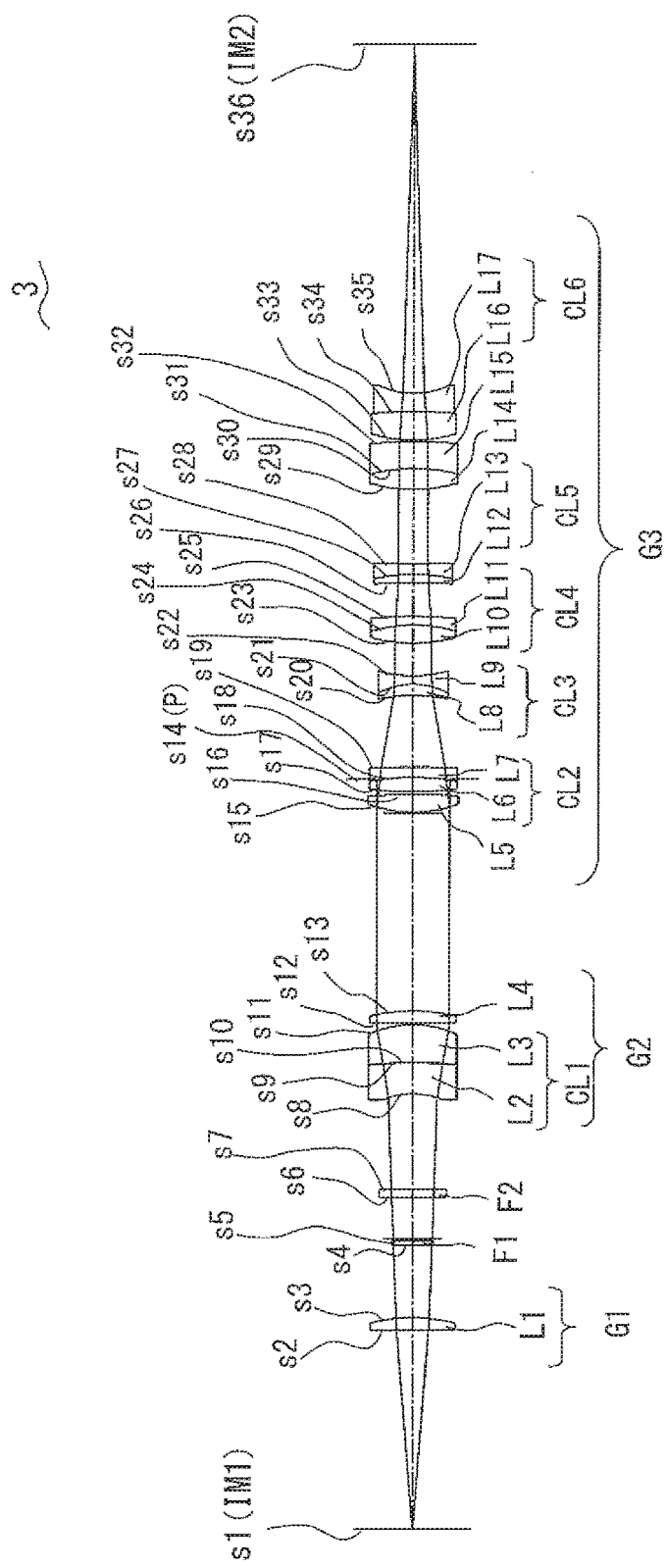
F I G. 5

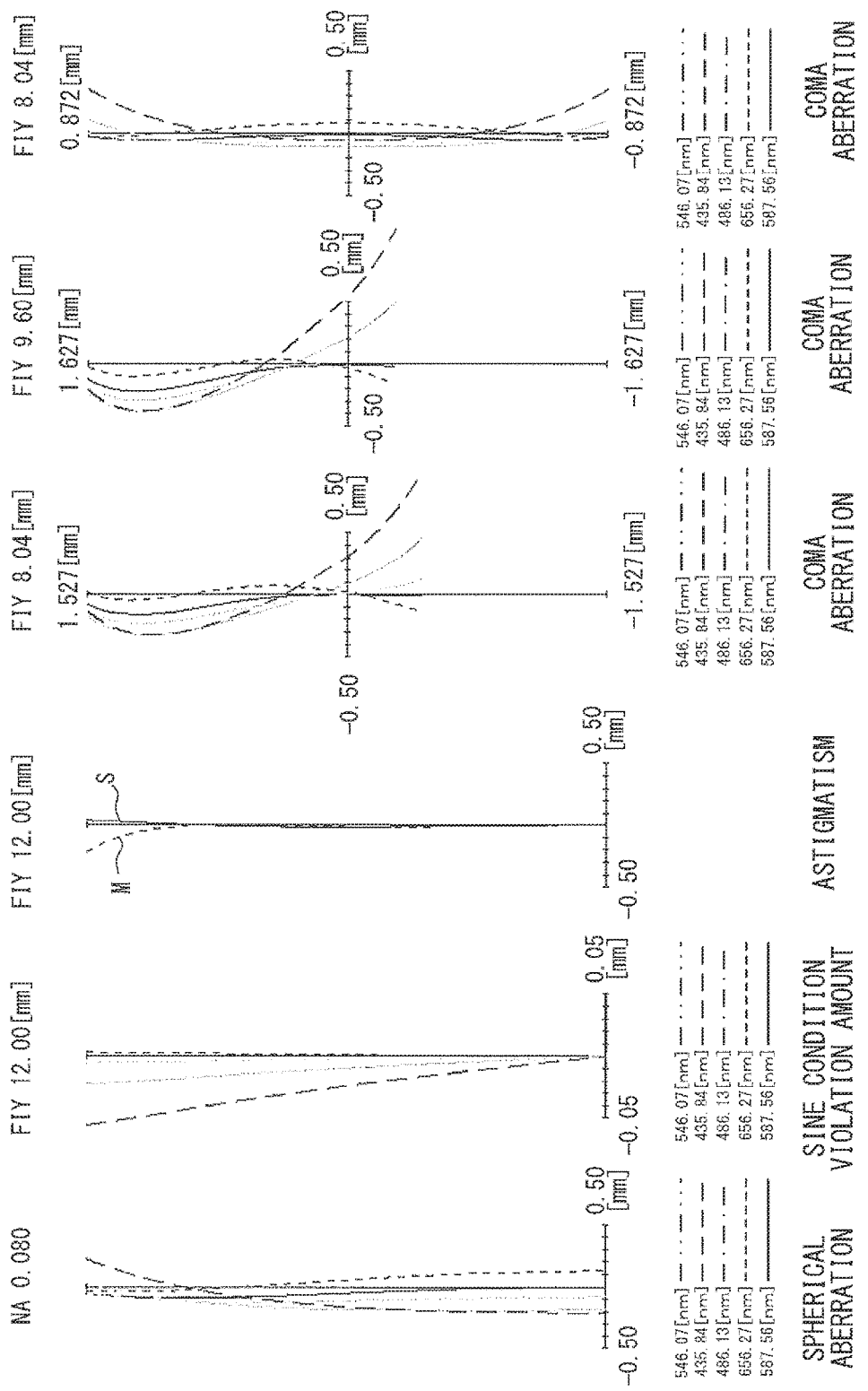

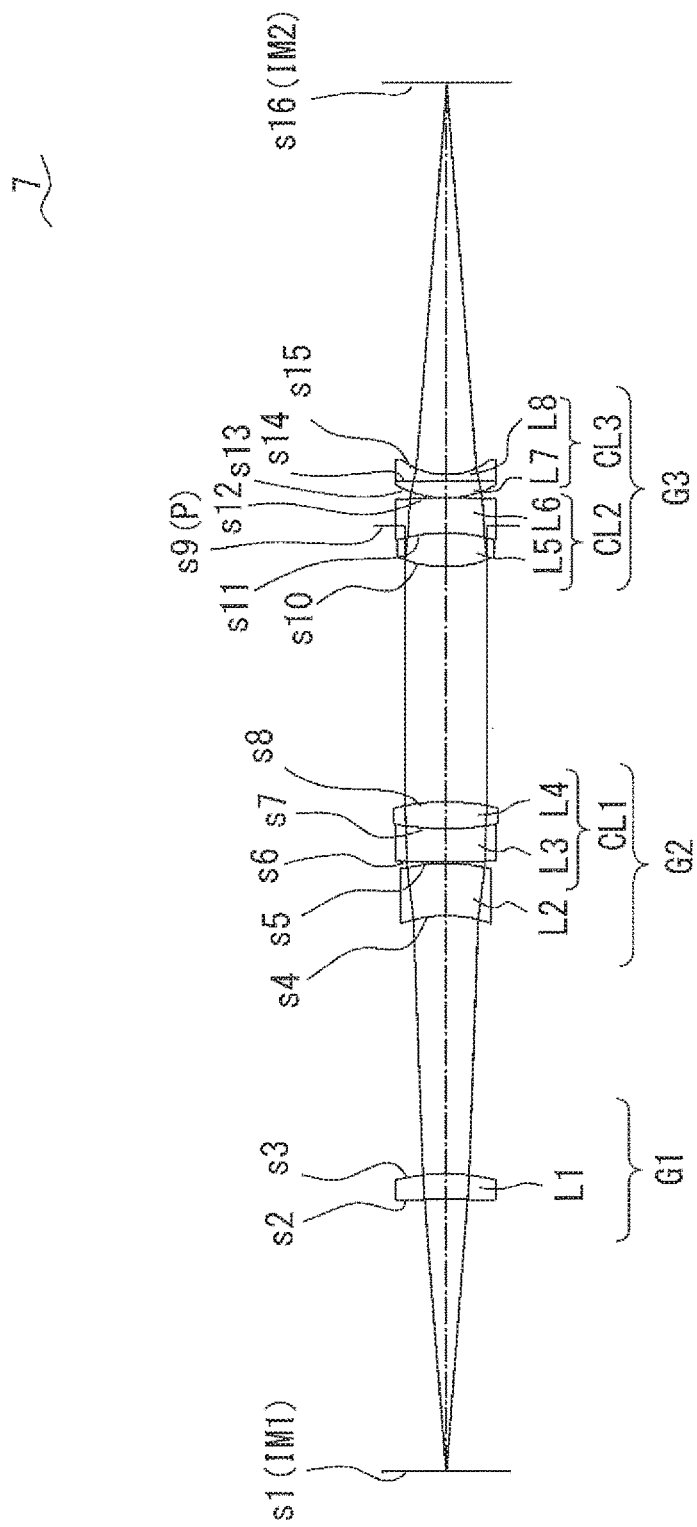
F I G. 1 3

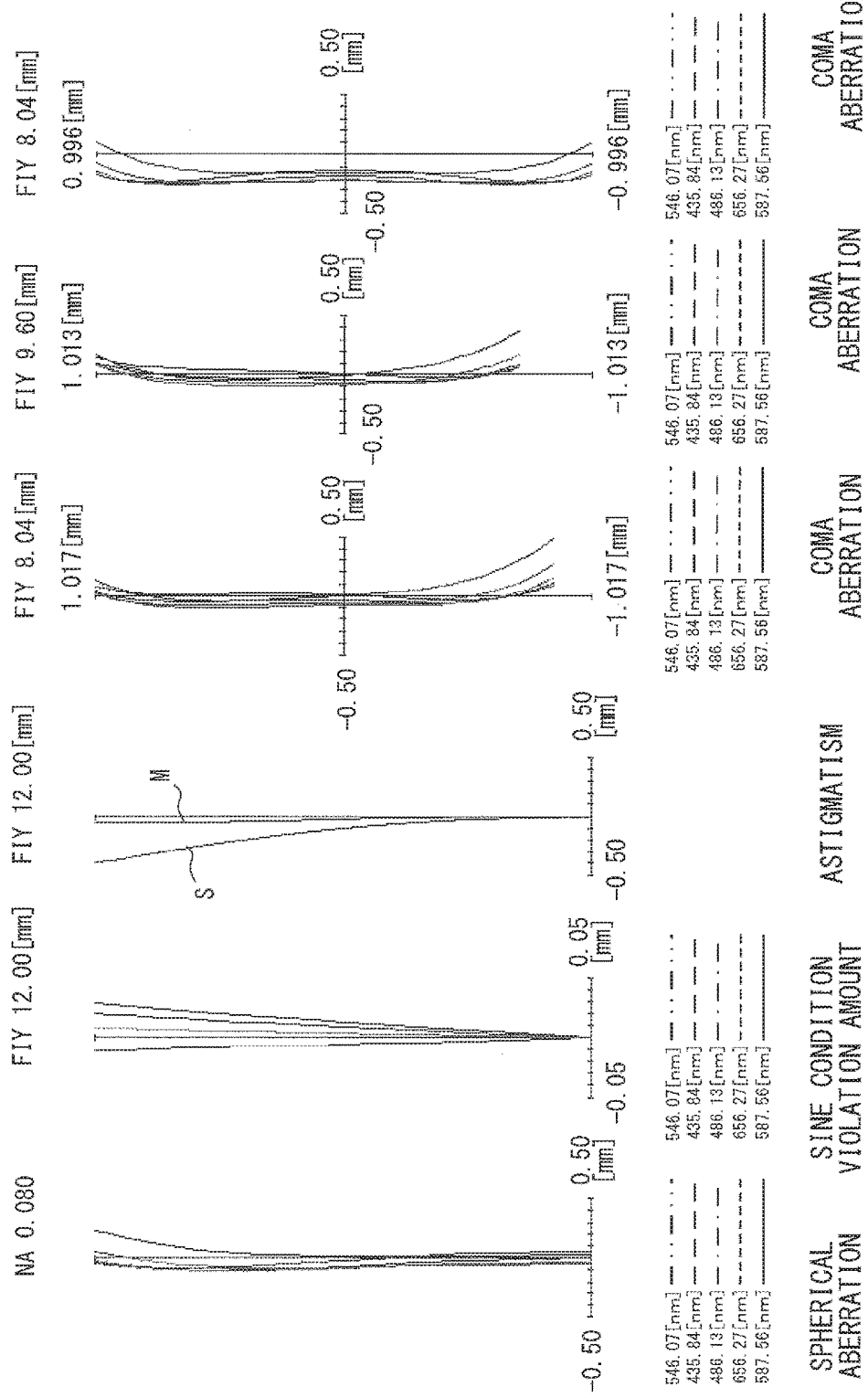

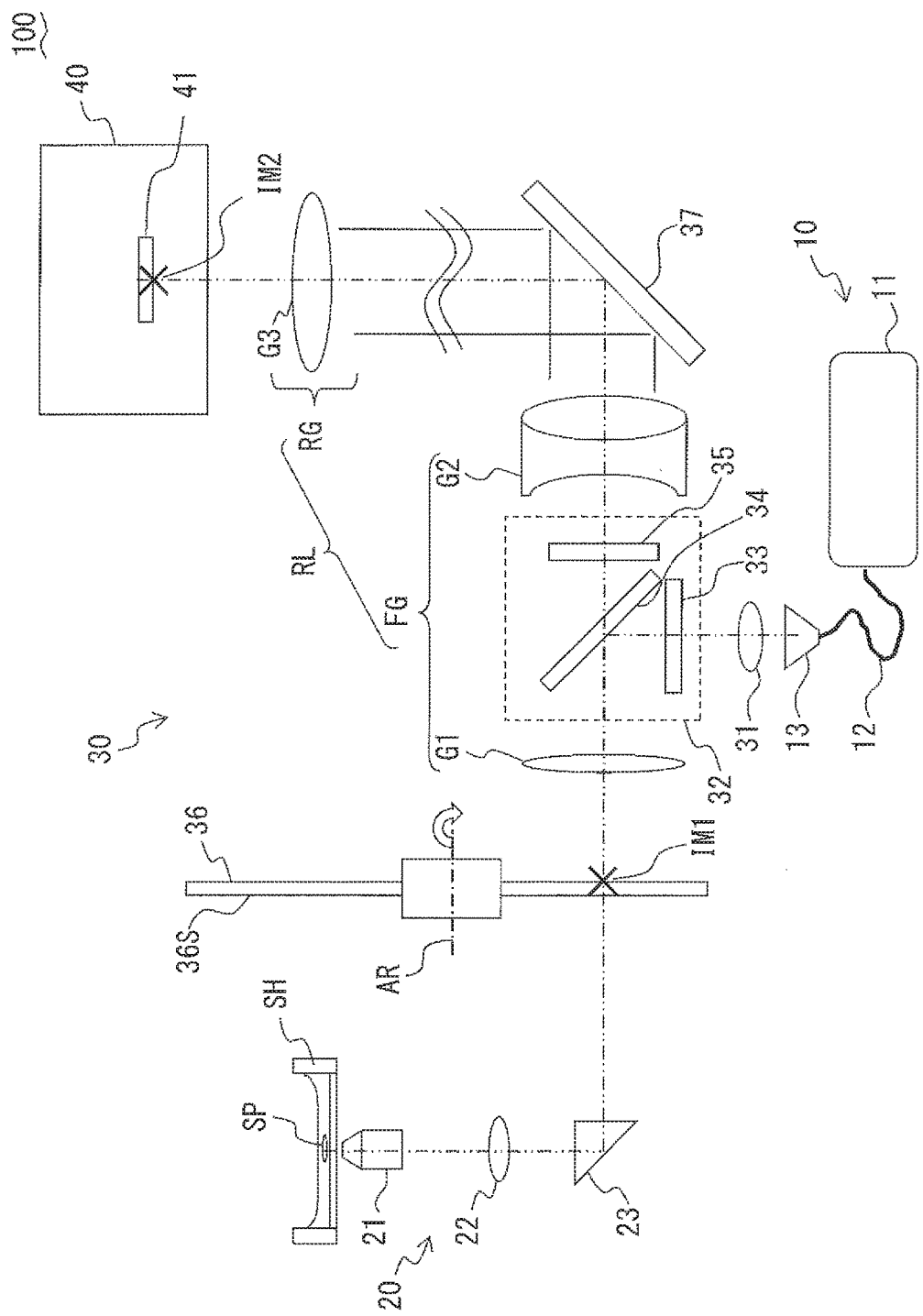
F I G. 17

RELAY OPTICAL SYSTEM AND MICROSCOPE APPARATUS

CROSS REFERENCE TO RELATED APPLICATIONS

This application is based upon and claims the benefit of priority from prior Japanese Patent Application No. 2015-24563, filed Feb. 10, 2015, the entire contents of which are incorporated herein by this reference.

BACKGROUND OF THE INVENTION

Field of the Invention

The present invention is related to a relay optical system and a microscope apparatus, and particularly to a relay optical system and a microscope apparatus that relay a primary image of a sample so as to form a secondary image, the primary image of the sample being formed by the objective and the tube lens of the microscope apparatus.

Description of the Related Art

In the field of microscope apparatuses, a configuration having a relay optical system that relays a primary image of a sample formed by the objective and the tube lens in order to form a secondary image is well known, and is disclosed in for example Japanese Laid-open Patent Publication No. 2009-122624.

Incidentally, a microscope apparatus employing Epi-illumination is provided with an optical-path splitter element such as a dichroic mirror, a half mirror, etc. in the optical axis of the objective in order to make the illumination light incident on the objective. Such an optical-path splitter element is generally provided in the a focal light flux passing between the objective and the tube lens. The microscope apparatus disclosed in Japanese Laid-open Patent Publication No. 2009-122624 also has this configuration, in which a dichroic mirror is provided between the objective and the tube lens.

SUMMARY OF THE INVENTION

An aspect of the present invention provides a relay optical system for a microscope apparatus that relays a primary image of an object formed by an objective and a tube lens and that forms a secondary image, the relay optical system including in an order from an object side a first lens group with positive power, a second lens group with positive power, and a third lens group with positive power, wherein the second lens group includes, closest to the object, a lens having a concave surface facing toward the object, and the relay optical system is configured in such a manner that a light flux passing between the second lens group and the third lens group is a substantially-parallel light flux, and satisfies condition expressions below, where $f_1$ represents a focal length of the first lens group, $d_1$ represents a length from the primary image to a surface closest to the object in the first lens group, $f_{12}$ represents a combined focal length of the first lens group and the second lens group, and $exp_{12}$ represents a length from an exit pupil position of an optical system consisting of the first lens group and the second lens group to a surface closest to the object in the second lens group, the exit pupil position being calculated by a paraxial ray tracing:

$$1 \leq f_1/d_1 \leq 4.3$$

$$0.16 \leq exp_{12}/f_{12} \leq 1.2.$$

Another aspect of the present invention provides a microscope apparatus including the relay optical system according to the above aspect.

BRIEF DESCRIPTION OF THE DRAWINGS

The present invention will be more apparent from the following detailed description when the accompanying drawings are referenced;

FIG. 1 is a sectional view showing the lens configuration of a relay optical system according to example 1 of the present invention;

FIG. 5 is a sectional view showing the lens configuration of a relay optical system according to example 3 of the present invention;

FIG. 12A through FIG. 12F are aberration diagrams of the relay optical system according to example 6 of the present invention;

FIG. 13 is a sectional view showing the lens configuration of a relay optical system according to example 7 of the present invention;

FIG. 14A through FIG. 14F are aberration diagrams of the relay optical system according to example 7 of the present invention;

FIG. 17 exemplifies the configuration of a microscope apparatus according to example 9 of the present invention.

DESCRIPTION OF THE EMBODIMENTS

Figure 2:
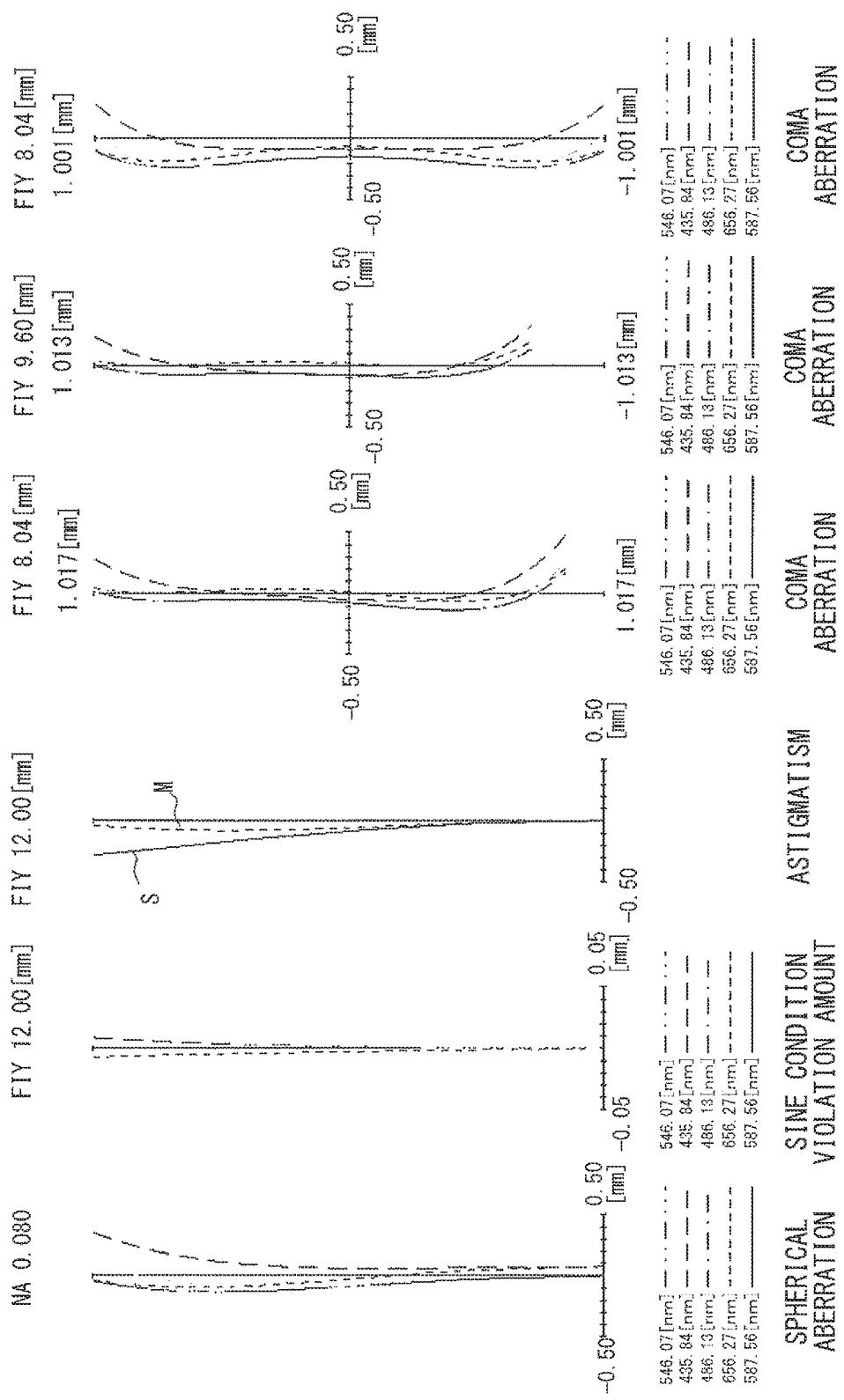
FIG. 2A through FIG. 2F are aberration diagrams of the relay optical system according to example 1 of the present invention.

Due to various reasons, it is in some cases impossible to provide an optical-path splitter element in the a focal light flux passing between the objective and the tube lens in a microscope apparatus. An example thereof is a case of a disk scanning microscope apparatus having a scanning disk placed in a primary image position. In this case, an optical-path splitter element such as a dichroic mirror etc. is arranged on the image side with respect to the primary image position i.e., in the relay optical system in order to make both illumination light and the observation light incident on the scanning disk.

Conventional relay optical systems are not designed based on an assumption that an optical-path splitter element such as a dichroic mirror is arranged in the relay optical system. Accordingly, when an optical-path splitter element is arranged in the relay optical system, aberrations occurring in the optical-path splitter element are not corrected sufficiently, leading to a possibility of the performance deterioration. In a relay optical system that realizes a wide field of view or a high numerical aperture (referred to as NA hereinafter) particularly, it is not possible to ignore the influence.

Hereinafter, the examples of the present invention will be explained.

A relay optical system according to each example of the present invention is a relay optical system for a microscope apparatus that relays a primary image of an object so as to form a secondary image, the primary image being formed by the objective and the tube lens. Hereinafter, configurations common to the relay optical systems of the respective examples will specifically be explained by referring to a relay optical system 1 shown in FIG. 1.

The relay optical system includes, in the order from the object side (i.e., side of primary image IM1), first lens group G1 with positive power, second lens group G2 with positive power, and third lens group G3 with positive power. Second lens group G2 has a lens, closest to the object, having the concave surface facing toward the object. Also, the relay optical system is configured in such a manner that the light flux (also referred to as a pencil of light) passing between second lens group G2 and third lens group G3 is a substantially-parallel light flux. Also, the relay optical system is configured in such a manner that the marginal ray height of a light flux emitted from second lens group G2 or the marginal ray height of a light flux incident on third lens group G3 becomes the maximum. Thus, the concave surface closest to the object side in second lens group G2 has a function of achieving an excellent balance between the spherical aberration and Petzval sum.

A relay optical system is designed on an assumption that an optical-path splitter element is included in the relay optical system on an as-needed basis, more specifically that an optical-path splitter element is arranged in the optical path between first lens group G1 and second lens group G2. This is because such an arrangement can reduce the number of lenses through which illumination light passes in the relay optical system, leading to the suppression of the occurrence of stray light such as autofluorescence.

Therefore, it is desirable that first lens group G1 consist of a minimum possible number (such as one or two) of lenses. It is also desirable that lens(es) constituting first lens group G1 be made of glass material that is less likely to cause autofluorescence.

Further, the light flux passing between first lens group G1 and second lens group G2 is a divergent light flux. Arranging an optical-path splitter element in the optical path of a divergent light flux changes the image position (the position of secondary image IM2) depending upon the thickness of the optical-path splitting element. This results in a situation where the image positions are different between a state with an optical-path splitter element and a state without an optical-path splitter element.

In view of this, the relay optical system is configured in such a manner that it satisfies condition expression (1) below, where $f_1$ represents the focal length of first lens group G1 and $d_1$ represents the length from primary image IM1 to surface (S2) closest to the object in first lens group G1.

$$1 \leq f_1/d_1 \leq 4.3 \quad (1)$$

Condition expression (1) defines the degree of divergence of the light flux passing between first lens group G1 and second lens group G2. Satisfying condition expression (1) makes it possible to suppress changes in the image position that depend upon whether or not an optical-path splitter element is inserted into the optical path.

When $f_1/d_1$ is smaller than the lower limit in condition expression (1), the light flux from primary image IM1 is converted into a convergent light flux by first lens group G1, preventing the light flux passing between second lens group G2 and third lens group G3 from becoming a substantially-parallel light flux. When $f_1/d_1$ is greater than the upper limit in condition expression (1), the degree of divergence of the light flux passing between first lens group G1 and second lens group G2 is too high, leading to a situation where the image position greatly changes depending upon whether or not an optical-path splitter element is inserted into the optical path.

There is a case where an optical filter such as a barrier filter etc. is disposed in addition to an optical-path splitter element between first lens group G1 and second lens group G2, and optical filters are designed to yield the best characteristic for the vertically-incident light as a general rule. Accordingly, optical filters tend to have deteriorated characteristic for light that is incident at a large incident angle (particularly, for an off-axis light).

In view of this, the relay optical system is configured to satisfy condition expression (2) below, where $f_{12}$ represents the combined focal length of first lens group G1 and second lens group G2, and $\exp_{12}$ represents the length from exit pupil position (P) of the optical system consisting of first lens group G1 and second lens group G2 to surface (s4) closest to the object in second lens group G2. Note that exit pupil position (P) is calculated by the paraxial ray tracing.

$$0.16 \leq \exp_{12}/f_{12} \leq 1.2 \quad (2)$$

Condition expression (2) defines the relationship between the combined focal length of first and second lens groups G1 and G2 and the exit pupil position, and satisfying condition expression (2) makes it possible to set the exit pupil position at an appropriate position with respect to first and second lens groups G1 and G2. Thereby, it is possible to bring out sufficiently the performance of an optical filter disposed between first and second lens groups G1 and G2 while providing excellent correction of an off-axis aberration, particularly a coma aberration.

When $\exp_{12}/f_{12}$ is smaller than the lower limit in condition expression (2), the angle of the off-axis light becomes too large between first and second lens groups G1 and G2. This deteriorates the characteristic of the optical filter with respect to the off-axis light, preventing the optical filter from exercising its performance sufficiently. When $\exp_{12}/f_{12}$ is greater than the upper limit in condition expression (2), the height of the principal ray incident on second lens group G2 varies, making it difficult to correct a coma aberration. In both cases, off-axis light particularly is affected greatly, making it difficult to secure optical performance for off-axis imaging when condition expression (2) is not satisfied.

By employing the above configuration and satisfying the above condition expressions, a relay optical system can maintain excellent optical performance even when an optical-path splitter element is arranged in the relay optical system.

Hereinafter, explanations will be given for a configuration that is more preferable for the relay optical system and conditions that it is desired to be satisfied.

It is desirable that second lens group G2 include at least three lenses, and include, closest to the object, a meniscus lens (lens L2) with negative power that consists of a single lens or a cemented lens and that has the concave surface facing toward the object. This is because the meniscus lens in second lens group G2 can increase the height of the ray passing through second lens group G2, making it possible for a lens with positive power located in a subsequent stage to correct an aberration.

Note that while a meniscus lens may be a single lens or a cemented lens, a cemented lens used herein may mean a lens consisting of a plurality of lenses that contact with each other only at their edges to form a meniscus configuration as a whole. This is because such a lens functions similarly to a normal meniscus lens. Also, such a lens is advantageous particularly when it is not desirable to use adhesive in a region through which a light flux passes on the surface of a lens or other situations.

Further, it is desirable that the meniscus lens (relay optical system) be configured to satisfy condition expression (3) below, where M represents the thickness of the meniscus lens, $nd_{G2}$ represents the refractive index of the lens closest to the object in second lens group G2 (i.e., the meniscus lens or the lens closest to the object in the meniscus lens) with respect to d-line, and R2 represents the curvature radius of the surface closest to the object in second lens group G2 (i.e., the concave surface closest to the object in the meniscus lens).

$$0.5 \leq M \times nd_{G2}/|R_2| \leq 2 \tag{3}$$

Condition expression (3) defines how sharply the height of the axial marginal ray increases in the meniscus lens having the concave surface facing toward the object in the second lens group. The height of the axial marginal ray increases as thickness M become larger, refractive index $nd_{G2}$ become larger, and the absolute value of curvature radius R2 become smaller. By satisfying this condition expression (3), a balance of the aberration amounts can be achieved between the axial marginal ray and the off-axis principal ray, making it possible to achieve excellent optical performance.

When $M \times nd_{G2}/|R_2|$ is smaller than the lower limit in condition expression (3), the height of the axial marginal ray does not increase sufficiently in the meniscus lens, preventing the sufficient correction of the axial aberration (spherical aberration and chromatic aberration) in the lens with positive power set immediately subsequent to the meniscus lens. When $M \times nd_{G2}/|R_2|$ is greater than the upper limit in condition expression (3), the height of the off-axis light changes more sharply than the axial light, increasing the amount of off-axis light aberrations (coma aberration and field curvature aberration).

The heights of the rays incident on first lens group G1 greatly vary depending upon the image heights corresponding to the respective rays. The heights of the rays incident on a lens subsequent to the meniscus lens in second lens group G2 also greatly vary depending upon the image heights corresponding to the respective rays. Accordingly, correcting the chromatic aberration of magnification in first lens group G1 and lenses subsequent to the meniscus lenses in second lens group G2 is very effective. It is desirable that lenses located in these positions be made of low dispersion materials, which are advantageous for the correction of a chromatic aberration of magnification, such as synthetic quartz, artificial fluorite, Extra-low dispersion glass, etc.

Further, in the lens subsequent to the meniscus lens in second lens group G2, the height of the axial marginal ray has also increased. Accordingly, correcting the axial chromatic aberration in a lens subsequent to the meniscus lens in second lens group G2 is also highly effective.

In view of this, it is desirable that the relay optical system satisfy condition expressions (4) and (5) below, where vG1 represents the Abbe number of the lens with the smallest Abbe number among lenses with positive power that constitute first lens group G1, and vG2 represents the Abbe number of the lens with the smallest Abbe number among lenses with positive power that constitute second lens group G2.

$$60 \leq v_{G1} \tag{4}$$

$$60 \leq v_{G2} \tag{5}$$

Condition expressions (4) and (5) define Abbe numbers, respectively. Satisfying condition expressions (4) and (5) makes it possible to provide excellent correction of a chromatic aberration of magnification and an axial chromatic aberration. The height of the axial principal ray is large in first lens group G1. Accordingly, satisfying condition expression (4) makes it possible to suppress the occurrence amount of a chromatic aberration of magnification in first lens group G1. When $v_{G1}$ is smaller than the lower limit in condition expression (4), a large chromatic aberration of magnification occurs in first lens group G1, making it difficult to correct the chromatic aberration of magnification. Also, the height of the marginal ray is large in second lens group G2. Accordingly, satisfying condition expression (5) makes it possible to suppress the occurrence amount of the axial chromatic aberration in second lens group G2. When $v_{G2}$ is smaller than the lower limit in condition expression (5), it is difficult to correct the axial chromatic aberration in second lens group G2.

Note that the relay optical system may satisfy condition expressions (4-1) and (5-1) below instead of condition expressions (4) and (5).

$$60 \leq v_{G1} \leq 100 \tag{4-1}$$

$$60 \leq v_{G2} \leq 100 \tag{5-1}$$

It is desirable that third lend group G3 include, in the order from the object side (side of primary image IM1), the 3-1st lens group with positive power and the 3-2nd lens group with negative power. It is also desirable that the 3-2nd lens group consist of one cemented lens or a single lens. In order to achieve both the performance with large image heights and the performance with high NA, it is desirable that a lens component with negative power be arranged closest to the image. This is because the height of the marginal ray is not so large in the lens component closest to the image, making it possible to adjust a spherical aberration appropriately. Also, this lens component has negative power and is accordingly effective for the correction of a field curvature.

Also, it is desirable that the relay optical system satisfy condition expression (6) below, where $f_3$ represents the combined focal length of the 3-1st lens group and the 3-2nd lens group, and $\exp_{123}$ represents the length from exit pupil position (P) of the optical system consisting of first lens group G1 and second lens group G2 to the surface (s11 in FIG. 1) closest to the object in third lens group G3. Further, it is defined that $\exp_{123}$ has a positive value when the exit pupil position is on the object side with respect to the surface closest to the object in third lens group G3 and has a negative value when the exit pupil position is on the image side with respect to the surface. Note that exit pupil position (P) is calculated by the paraxial ray tracing.

$$-0.5 \leq \exp_{123}/f_3 \leq 0.7 \qquad (6)$$

Condition expression (6) defines the relationship between the position of third lens group G3 with respect to the exit pupil position of the optical system consisting of first lens group G1 and second lens group G2 and the focal length of third lens group G3 (more strictly, the relationship with the combined focal length of the 3-1st lens group and the 3-2nd lens group). Satisfying condition expression (6) makes it possible to prevent excessive increase of the ray height in third lens group G3.

When $\exp_{123}/f_3$ is lower than the lower limit in condition expression (6) or higher than the upper limit in condition expression (6), the absolute value of the ray height of the off-axis light incident on third lens group G3 becomes great, making it difficult to correct an off-axis aberration in third lens group G3.

Also, it is desirable that the relay optical system satisfy condition expression (7) below, where $f_{3-1}$ represents the focal length of the 3-1st lens group and $f_{3-2}$ represents the focal length of the 3-2nd lens group.

$$-0.8 \leq f_{3-1}/f_{3-2} \leq -0.1 \qquad (7)$$

Condition expression (7) defines the relationship of the focal lengths between the 3-1st lens group and the 3-2nd lens group. Satisfying condition expression (7) makes it possible to provide excellent correction of a spherical aberration and a field curvature.

When $f_{3-1}/f_{3-2}$ is lower than the lower limit in condition expression (7), the negative power of the 3-2nd lens group becomes too large, making Petzval sum of the entire lens system too large and causing a field curvature. When $f_{3-1}/f_{3-2}$ is higher than the upper limit in condition expression (7), the positive power of the 3-1st lens group becomes too large, increasing the occurrence amount of the spherical aberration and making it difficult to correct the spherical aberration in the entire system.

Also, it is desirable that the relay optical system satisfy conditional expressions (8) and (9) below, where $R_a$ represents the curvature radius of the surface closest to the object in the 3-1st lens group, $R_b$ represents the curvature radius of the surface closest to the image in the 3-1st lens group, and $R_c$ represents the curvature radius of the surface closest to the object in the 3-2nd lens group.

$$2 \leq R_b/R_c \leq 13 \qquad (8)$$

$$1.5 \leq R_b/R_a \leq 12 \qquad (9)$$

Condition expression (8) defines the relationship between the curvature radius of the surface closest to the image in the 3-1st lens group and the curvature radius of the surface closest to the object in the 3-2nd lens group. Condition expression (9) defines the relationship between the curvature radius of the surface closest to the object in the 3-1st lens group and the curvature radius of the surface closest to the image in the 3-1st lens group. Satisfying conditional expressions (8) and (9) makes it possible to provide excellent correction of a spherical aberration and an off-axial coma aberration.

When $R_b/R_c$ or $R_b/R_a$ is lower than the lower limit in condition expression (8) or condition expression (9), the curvature radius of the surface closest to the image in the 3-1st lens group becomes too small, leading to increase in the amount of the spherical aberration occurring in the 3-1st lens group. Further, it leads that amount of aberrations (amount of corrections) caused in the 3-1st lens group for correcting the coma aberrations occurring in other lens groups becomes excessive, making it difficult to achieve the balance of aberrations in the entire relay system. When $R_b/R_c$ is greater than the upper limit in condition expression (8), the curvature radius of the surface closest to the object particularly in the 3-2nd lens group becomes small, leading to an excessive correction of the coma aberration in that surface. When $R_b/R_a$ is greater than the upper limit in condition expression (9), the curvature radius of the surface closest to the object in the 3-1st lens group becomes small, leading to increase in the occurrence amount of the spherical aberration in that surface.

Further, it is desirable that third lens group G3 consist of four lenses or more and that it include at least one cemented lens. Third lens group G3 has a function of adjusting the axial chromatic aberration that the first and second lens groups fail to correct completely and of causing an off-axis aberration including a chromatic aberration of magnification in the opposite direction from that caused in the first and second lens groups in order to conduct correction. When the third lens group includes four lenses or more including a cemented lens having a difference of Abbe numbers, excellent adjustment of aberrations can be provided.

Further, it is desirable that the 3-1st lens group consist of, in the order from the object side, a lens with positive power having Abbe number $\nu_{Ga}$, and a lens with negative power having Abbe number $\nu_{Gb}$. It is also desirable that the relay optical system satisfy condition expression (10) below.

$$\nu_{Ga} - \nu_{Gb} \geq 30 \qquad (10)$$

Condition expression (10) defines the Abbe number of a lens, and satisfying condition expression (10) makes it possible to provide excellent correction of a chromatic aberration (an axial chromatic aberration and a chromatic aberration of magnification) in third lens group G3.

When $\nu_{Ga} - \nu_{Gb}$ is lower than the lower limit in condition expression (10), it is difficult to correct a chromatic aberration in third lens group G3.

Note that the relay optical system may satisfy condition expression (10-1) below instead of condition expression (10).

$$50 \leq \nu_{Ga} - \nu_{Gb} \leq 100 \qquad (10\text{-}1)$$

It is also desirable that the relay optical system satisfy condition expression (11) below, where $L_{23}$ represents the length between second lens group G2 and third lens group G3.

$$0.2 \leq L_{23}/f_{12} \leq 1 \qquad (11)$$

The off-axis principal ray passing through the relay optical system passes on the opposite sides with respect to the optical axis between when it passes through first and second lens groups G1 and G2 and when it passes through third lens group G3. Accordingly, off-axis aberrations occur in the opposite directions between first and second lens groups G1 and G2 and third lens group G3, causing the aberrations to cancel each other, and thereby it is possible to correct an off-axis aberration at a high level. Satisfying condition expression (11) makes it possible to maintain excellent correction of off-axis aberrations at a high level.

When $L_{23}/f_{12}$ is lower than the lower limit in condition expression (11), it is not possible to increase the height of the off-axis principal ray in third lens group G3 sufficiently, leading to an insufficient amount of aberrations caused in the third lens group G3 for correcting aberrations having occurred in second lens group G2 and making it difficult to correct an off-axis aberration. When $L_{23}/f_{12}$ is higher than the upper limit in condition expression (11), the height of the off-axis principal ray incident on third lens group G3 is excessively higher than the height of the off-axis principal ray when passing through second lens group G2, leading to excessive increase in the amount of aberration occurring in third lens group G3. This makes it difficult to correct the off-axis aberration.

Also, it is desirable that the relay optical system satisfy condition expression (12) below.

$$0.4 \le f_1/f_{12} \le 1.5 \tag{12}$$

Condition expression (12) defines the power allocation of first lens group G1 and second lens group G2. Satisfying condition expression (12) results in appropriate allocation of the power of first lens group G1 and second lens group G2, making it possible to provide excellent suppression of the spherical aberration in the entire system.

When $f_1/f_{12}$ is lower than the lower limit in condition expression (12), the power is concentrated on second lens group G2, leading to a situation where the marginal ray is greatly refracted in the second lens group G2 and an excessive aberration occurs. When $f_1/f_{12}$ is higher than the upper limit in condition expression (12), the power of first lens group G1 becomes too high, leading to a situation where the marginal ray is sharply refracted in the first lens group G1 and an excessive aberration occurs.

Note that condition expressions (3) through (12) may arbitrarily be combined with condition expressions (1) and (2). Also, each condition expression may define the target value by using only one of the upper limit and the lower limit.

Example 1

FIG. 1 is a sectional view showing the lens configuration of a relay optical system 1 according to the present example. Note that in FIG. 1, the principal ray (dot-and-dash line) and the marginal ray (solid line) of the axial light are also depicted in addition to the lens configuration. This point also applies to the subsequent examples and will not be explained in those examples.

The relay optical system 1 is a relay optical system for a microscope, consists of, in the order from the object side (the side of primary image M1), first lens group G1 with positive power, second lens group G2 with positive power and third lens group G3 with positive power. The relay optical system 1 is configured so that the light flux passing between second lens group G2 and third lens group G3 is a substantially-parallel light flux. This configuration also applies to the subsequent examples, and will not be explained in those examples.

In the relay optical system 1, exit pupil position P of an optical system consisting of first lens group G1 and second lens group G2 (referred to simply as an exit pupil position hereinafter) is located between second lens group G2 and third lens group G3. Note that exit pupil position (P) is calculated by the paraxial ray tracing.

First lens group G1 includes a planoconvex lens (lens L1) that is a single lens and that has the planar surface facing toward the object. Second lens group G2 includes, in the order from the object side, a meniscus lens (lens L2) with negative power having the concave surface facing toward the object, a biconcave lens (lens L3) and a biconvex lens (lens L4).

Third lens group G3 includes, in the order from the object side, the 3-1st lens group with positive power and the 3-2nd lens group with negative power. The 3-1st lens group includes, in the order from the object side, a biconvex lens (lens L5) with positive power and a meniscus lens (lens L6) with negative power. The 3-2nd lens group includes cemented lens CL1, and cemented lens CL1 includes, in the order from the object side, a planoconvex lens (lens L7) having the convex surface facing toward the object and a planoconcave lens (lens L8) having the planar surface facing toward the object.

Hereinafter, data of the relay optical system 1 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08 the magnification of the entire relay optical system (referred to as β hereinafter)=1.0

$f_1$=120.4 mm $f_2$=364.9 mm $f_3$=156.5 mm $f_{12}$=156.7 mm $f_{3-1}$=126.6 mm $f_{3-2}$=−319 mm

The lens data of the relay optical system 1 is as below.

| Relay optical system 1 | | | | |
|---|---|---|---|---|
| s | r | d | nd | vd |
| s1(IM1) | INF | 65.89 | 1 | |
| s2 | INF | 4.10 | 1.45852 | 67.83 |
| s3 | −55.2 | 75.80 | 1 | |
| s4 | −21.826 | 16.50 | 1.8061 | 40.92 |
| s5 | −34.2263 | 0.50 | 1 | |
| s6 | −216.6539 | 9.87 | 1.65412 | 39.68 |
| s7 | 90.7927 | 0.01 | 1 | |
| s8 | 91.7356 | 7.85 | 1.43875 | 94.93 |
| s9 | −41.2587 | 60.39 | 1 | |
| s10(P) | INF | 9.61 | 1 | |
| s11 | 61.4679 | 8.00 | 1.43875 | 94.93 |
| s12 | −61.4678 | 0.07 | 1 | |
| s13 | −59.3059 | 6.00 | 1.6134 | 44.27 |
| s14 | −151.2146 | 1.00 | 1 | |
| s15 | 55.2441 | 10.00 | 1.7859 | 44.2 |
| s16 | INF | 6.00 | 1.741 | 52.64 |
| s17 | 37.1937 | 116.49 | 1 | |
| s18(IM2) | INF | 0 | | |

In the above, s represents the surface number, r represents the curvature radius (mm), d represents the surface interval (mm), nd represents the refractive index with respect to d-line and vd represents the Abbe number. These symbols represent the same factors also in the subsequent examples and will not be explained in those examples. Note that, in the present example, surface numbers s1 and s18 represent the primary imaging plane and the secondary imaging plane, respectively, and surface numbers s2 and s17 represent the first surface and the last surface in the relay optical system 1, respectively. Surface number s10 represents the exit pupil position.

The relay optical system 1 according to the present example satisfies condition expressions (1) through (12) as represented by expressions (A1) through (A12) below. Note that expressions (A1) through (A12) correspond to condition expressions (1) through (12), respectively.

$$f_1/d_1 = 1.82 \tag{A1}$$

$$\exp_{12}/f_{12} = 0.39 \tag{A2}$$

$$M \times nd_{G2}/|R_2| = 1.81 \tag{A3}$$

$$\nu_{G1} = 67.83 \tag{A4}$$

$$\nu_{G2} = 94.93 \tag{A5}$$

$$\exp_{123}/f_3 = -0.06 \tag{A6}$$

$$f_{3-1}/f_{3-2} = -0.40 \tag{A7}$$

$$R_b/R_c = 2.74 \tag{A8}$$

$$R_b/R_a = 2.46 \tag{A9}$$

$$\nu_{Ga} - \nu_{Gb} = 50.66 \tag{A10}$$

$$L_{23}/f_{12} = 0.45 \tag{A11}$$

$$f_1/f_{12} = 0.77 \tag{A12}$$

FIG. 2A through FIG. 2F are aberration diagrams of the relay optical system 1 according to the present example, and show aberrations on the secondary imaging plane. FIG. 2A is a spherical aberration diagram, FIG. 2B is a diagram showing a sine condition violation amount, FIG. 2C is a diagram showing an astigmatism. FIG. 2D is a diagram showing the Y-directional coma aberration at the position with the image height ratio of 0.67, FIG. 2E is a diagram showing the Y-directional coma aberration at the position with the image height ratio of 0.8, and FIG. 2F is a diagram showing the X-directional coma aberration at the position with the image height ratio of 0.67. It is shown that the aberration in each state is corrected well.

Note that "M" in the diagram represents a meridional component, and "S" represents a sagittal component. These symbols represent the same factors in the subsequent examples and will not be explained in those examples.

Example 2

Figure 3:
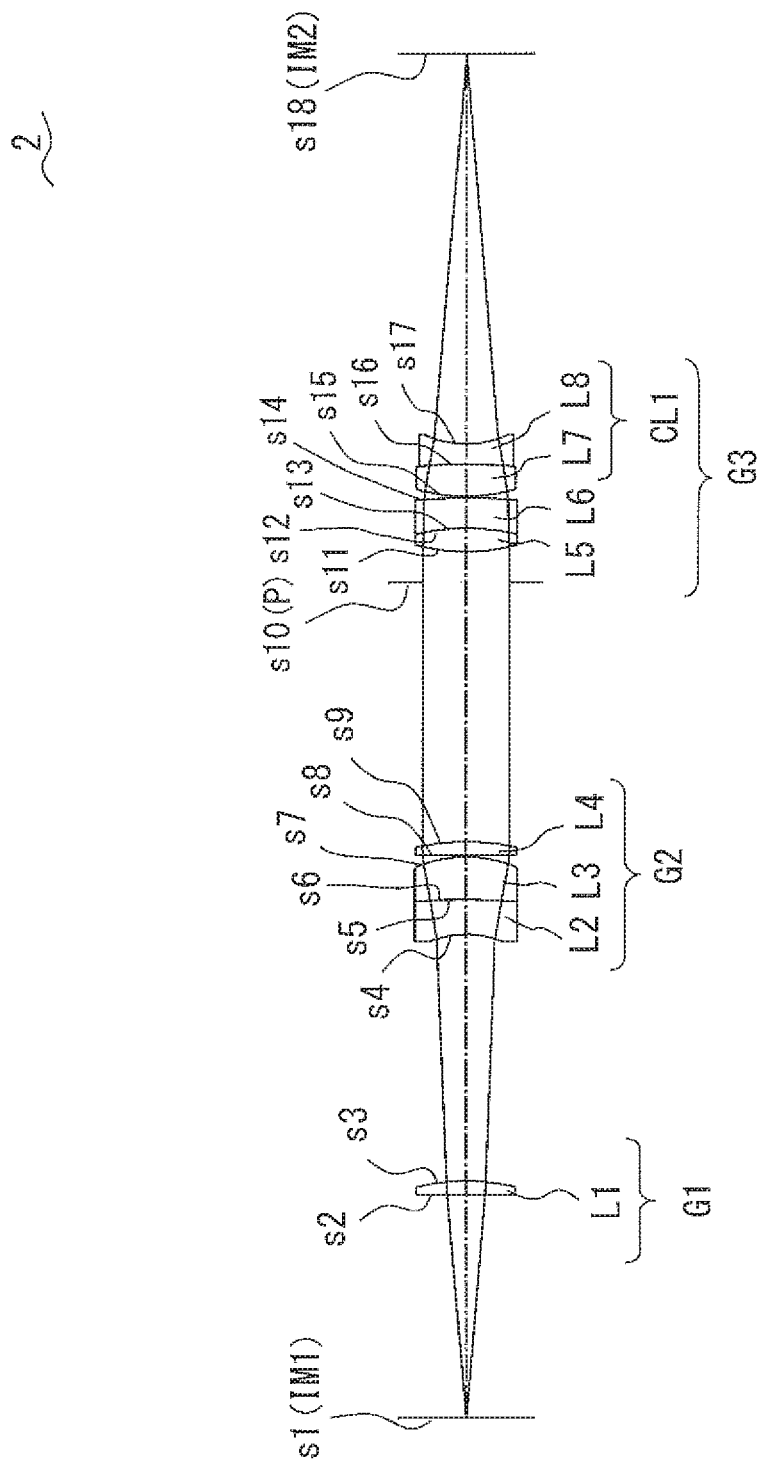
FIG. 3 is a sectional view showing the lens configuration of a relay optical system according to example 2 of the present invention.

FIG. 3 is a sectional view showing the lens configuration of a relay optical system 2 according to the present example. In the relay optical system 2, exit pupil position P of an optical system consisting of first lens group G1 and second lens group G2 is located between second lens group G2 and third lens group G3.

First lens group G1 includes a planoconvex lens (lens L1) that is a single lens and that has the planar surface facing toward the object. Second lens group G2 includes, in the order from the object side, a meniscus lens (lens L2) with negative power having the concave surface facing toward the object, a meniscus lens (lens L3) with positive power having the concave surface facing toward the object and a planoconvex lens (lens L4) having the planar surface facing toward the object.

Third lens group G3 includes, in the order from the object side, the 3-1st lens group with positive power and the 3-2nd lens group with negative power. The 3-1st lens group includes, in the order from the object side, a biconvex lens (lens L5) with positive power and a meniscus lens (lens L6) with negative power having the concave surface facing toward the object. The 3-2nd lens group includes cemented lens CL1, and cemented lens CL1 includes, in the order from the object side, a biconvex lens (lens L7) and a biconcave lens (lens L8).

Hereinafter, data of the relay optical system 2 according to the present example will be described.

Numerical aperture NA on the image side (side of secondary image IM2), focal length $f_1$ of first lens group G1, focal length $f_2$ of second lens group G2, combined focal length $f_{12}$ of first lens group G1 and second lens group G2, the focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08β=1.0
$f_1$=130.8 mm
$f_2$=330.6 mm
$f_3$=156.4 mm
$f_{12}$=155.2 mm
$f_{3-1}$=143.9 mm
$f_{3-2}$=−503 mm

The lens data of the relay optical system 2 is as below.

| Relay optical system 2 | | | | |
|---|---|---|---|---|
| s | r | d | nd | νd |
| s1(IM1) | INF | 66.54 | 1 | |
| s2 | INF | 4.20 | 1.43875 | 94.93 |
| s3 | −57.408 | 73.50 | 1 | |
| s4 | −27.918 | 10.33 | 1.816 | 46.62 |
| s5 | −195.737 | 0.15 | 1 | |
| s6 | −152.781 | 12.67 | 1.59522 | 67.74 |
| s7 | −36.576 | 0.50 | 1 | |
| s8 | INF | 4.00 | 1.43875 | 94.93 |
| s9 | −67.926 | 77.23 | 1 | |
| s10 | INF | 9.27 | 1 | |
| s11 | 53.508 | 7.00 | 1.43875 | 94.93 |
| s12 | −60.966 | 0.01 | 1 | |
| s13 | −60.57 | 9.00 | 1.8 | 29.84 |
| s14 | −167.844 | 0.50 | 1 | |
| s15 | 51.395 | 9.50 | 1.801 | 34.97 |
| s16 | −179.714 | 6.10 | 1.6134 | 44.27 |
| s17 | 28.308 | 116.48 | 1 | |
| s18(IM2) | INF | 0.00 | | |

In the present example, surface numbers s1 and s18 represent the primary imaging plane and the secondary imaging plane, respectively, and surface numbers s2 and s17 represent the first surface and the last surface in the relay optical system 2, respectively. Surface number s10 represents the exit pupil position.

The relay optical system 2 according to the present example satisfies condition expressions (1) through (12) as represented by expressions (B1) through (B12) below. Note that expressions (B1) through (B12) correspond to condition expressions (1) through (12), respectively.

$$f_1/d_1 = 1.95 \tag{B1}$$

$$\exp_{12}/f_{12} = 0.50 \tag{B2}$$

$$M \times nd_{G2}/|R_2| = 1.50 \tag{B3}$$

$$\nu_{G1} = 94.93 \tag{B4}$$

$$\nu_{G2} = 94.93 \tag{B5}$$

$\exp_{123}/f_3 = -0.06$ (B6)

$f_{3-1}/f_{3-2} = -0.29$ (B7)

$R_b/R_c = 3.27$ (B8)

$R_b/R_a = 3.14$ (B9)

$\nu_{Ga} - \nu_{Gb} = 65.09$ (B10)

$L_{23}/f_{12} = 0.56$ (B11)

$f_1/f_{12} = 0.84$ (B12)

Figure 4:
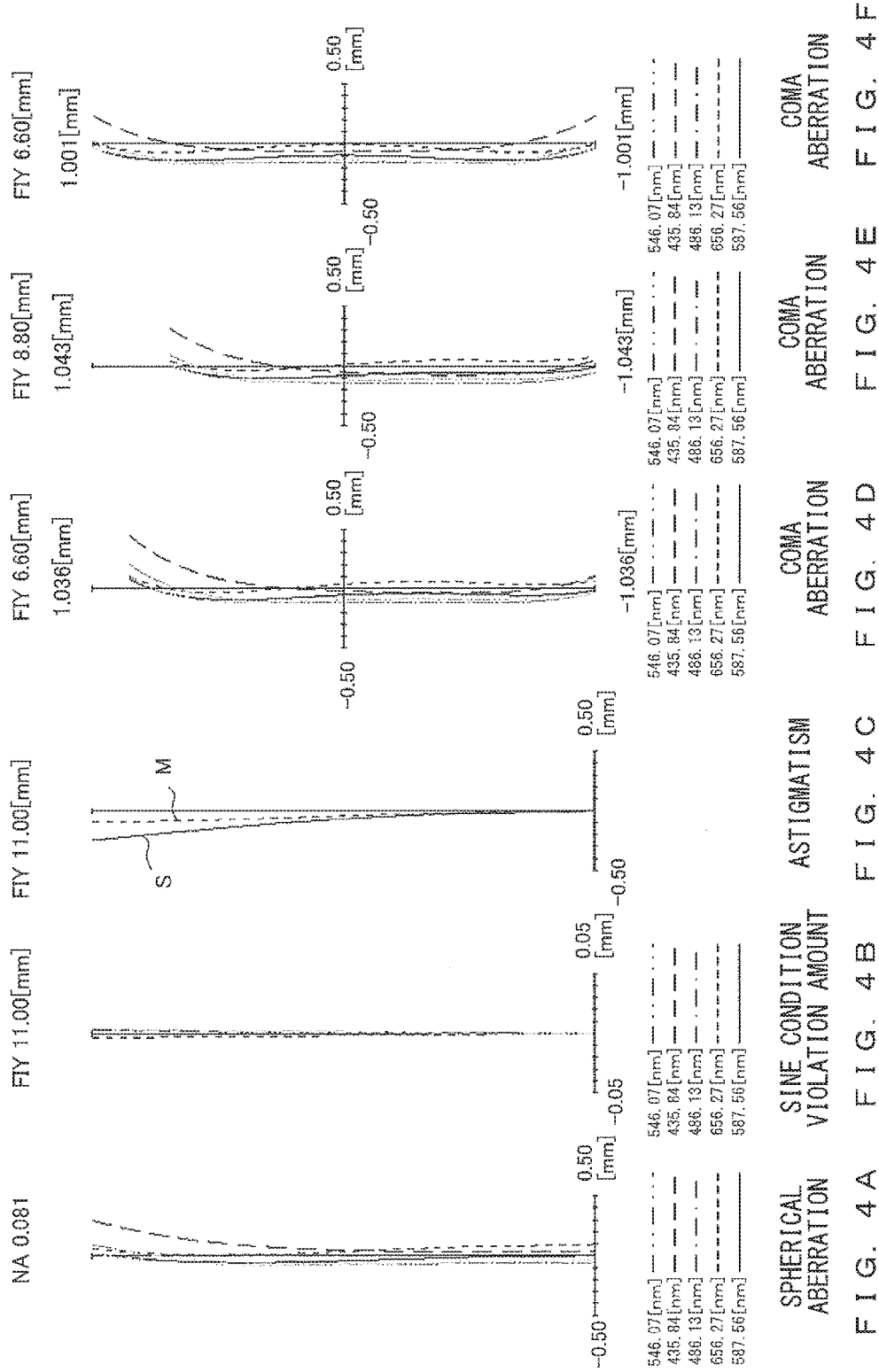
FIG. 4A through FIG. 4F are aberration diagrams of the relay optical system according to example 2 of the present invention.

FIG. 4A through FIG. 4F are aberration diagrams of the relay optical system 2 according to the present example, and show aberrations on the secondary imaging plane. FIG. 4A is a spherical aberration diagram, FIG. 4B is a diagram showing a sine condition violation amount, FIG. 4C is a diagram showing an astigmatism. FIG. 4D is a diagram showing the Y-directional coma aberration at the position with the image height ratio of 0.6, FIG. 4E is a diagram showing the Y-directional coma aberration at the position with the image height ratio of 0.8, and FIG. 4F is a diagram showing the X-directional coma aberration at the position with the image height ratio of 0.6. It is shown that the aberration in each state is corrected well.

Example 3

FIG. 5 is a sectional view showing the lens configuration of a relay optical system 3 according to the present example. In the relay optical system 3, differently from example 1 or 2, exit pupil position P of an optical system consisting of first lens group G1 and second lens group G2 is located in third lens group G3.

First lens group G1 includes a planoconvex lens (lens L1) that is a single lens and that has the planar surface facing toward the object. Two optical filters (optical filters F1 and F2) are arranged between first lens group G1 and second lens group G2. Second lens group G2 includes, in the order from the object side, cemented lens CL1 and a planoconvex lens (lens L4) having the planar surface facing toward the object. Cemented lens CL1 is a cemented lens employing as a whole a meniscus configuration in which the lenses contact with each other only at their edges and the concave surface faces toward the object. Cemented lens CL1 includes a biconcave lens (lens L2) and a biconvex lens (lens L3) in the order from the object side.

Third lens group G3 includes, in the order from the object side, a meniscus lens (lens L5) with positive power having the convex surface facing toward the object, cemented lens CL2 consisting of a biconvex lens (lens L6) and a biconcave lens (lens L7), cemented lens CL3 consisting of a meniscus lens (lens L8) with positive power having the concave surface facing toward the object and a biconcave lens (lens L9), cemented lens CL4 consisting of a biconvex lens (lens L10) and a biconcave lens (lens L11), cemented lens CL5 consisting of a biconvex lens (lens L12) and a biconcave lens (lens L13), a biconvex lens (lens L14), a biconcave lens (lens L15), and cemented lens CL6 consisting of a meniscus lens (lens L16) with positive power having the convex surface facing toward the object and a meniscus lens (lens L17) with negative power having the convex surface facing toward the object. In this example, lenses L14 and L15 constitute the 3-1st lens group with positive power, and cemented lens CL6 constitutes the 3-2nd lens group with negative power.

Hereinafter, data of the relay optical system 3 according to the present example will be described.

Numerical aperture NA on the image side (side of secondary image IM2), focal length $f_1$ of first lens group G1, focal length $f_2$ of second lens group G2, combined focal length $f_{12}$ of first lens group G1 and second lens group G2, combined focal length $f_3$ of the 3-1st lens group and the 3-2nd lens group, focal length $f_{3-1}$ of the 3-1st lens group and focal length $f_{3-2}$ of the 3-2nd lens group are as below.

NA=0.08 β=2.51
$f_1$=130.8 mm
$f_2$=330.6 mm
$f_3$=390.8 mm
$f_{12}$=155.1 mm
$f_{3-1}$=359.5 mm
$f_{3-2}$=−503 mm

The lens data (including data of the optical filters) of the relay optical system 3 is as below.

| | Relay optical system 3 | | | |
|---|---|---|---|---|
| s | r | d | nd | vd |
| s1(IM1) | INF | 66.54 | | |
| s2 | INF | 4.20 | 1.43875 | 94.93 |
| s3 | −57.408 | 24.17 | 1 | |
| s4 | INF | 1.40 | 1.51633 | 64.14 |
| s5 | INF | 14.60 | 1 | |
| s6 | INF | 2.50 | 1.51633 | 64.14 |
| s7 | INF | 32.00 | 1 | |
| s8 | −27.918 | 10.33 | 1.816 | 46.62 |
| s9 | −195.737 | 0.15 | 1 | |
| s10 | −152.781 | 12.67 | 1.59522 | 67.74 |
| s11 | −36.576 | 0.50 | 1 | |
| s12 | INF | 4.00 | 1.43875 | 94.93 |
| s13 | −67.926 | 77.46 | 1 | |
| s14 | INF | −10.96 | 1 | |
| s15 | 45.833 | 5.80 | 1.51633 | 64.14 |
| s16 | 271.062 | 1.00 | 1 | |
| s17 | 122.686 | 4.80 | 1.43875 | 94.93 |
| s18 | −84.03 | 3.40 | 1.80518 | 25.42 |
| s19 | 466.733 | 23.99 | 1 | |
| s20 | −58.277 | 3.70 | 1.8081 | 22.76 |
| s21 | −25.94 | 2.80 | 1.72916 | 54.68 |
| s22 | 43.785 | 11.00 | 1 | |
| s23 | 59.222 | 6.00 | 1.56873 | 63.1 |
| s24 | −50.223 | 2.84 | 1.6727 | 32.1 |
| s25 | 216.988 | 11.15 | 1 | |
| s26 | 347.604 | 2.95 | 1.78472 | 25.68 |
| s27 | −62.029 | 3.30 | 1.72916 | 54.68 |
| s28 | 62.029 | 25.00 | 1 | |
| s29 | 53.508 | 7.00 | 1.43875 | 94.93 |
| s30 | −60.966 | 0.01 | 1 | |
| s31 | −60.57 | 9.00 | 1.8 | 29.84 |
| s32 | 167.844 | 0.50 | 1 | |
| s33 | 51.395 | 9.50 | 1.801 | 34.97 |
| s34 | 179.714 | 6.10 | 1.6134 | 44.27 |
| s35 | 28.308 | 116.47 | 1 | |
| s36(IM2) | INF | 0.00 | | |

In the present example, surface numbers s1 and s36 represent the primary imaging plane and the secondary imaging plane, respectively, and surface numbers s2 and s35 represent the first surface and the last surface of the relay optical system 3, respectively. Surface number s14 represents the exit pupil position.

The relay optical system 3 according to the present example satisfies condition expressions (1) through (12) as represented by expressions (C1) through (C12) below. Note that expressions (C1) through (C12) correspond to condition expressions (1) through (12), respectively.

$f_1/d_1 = 1.95$ (C1)

$\exp_{12}/f_{12} = 0.50$ (C2)

$m \times nd_{G2}/|R_2| = 1.50$ (C3)

$\nu_{G1} = 94.93$ (C4)

$v_{G2}=94.93$ (C5)

$\exp_{123}/f_3=0.03$ (C6)

$f_{3\text{-}1}/f_{3\text{-}2}=-0.72$ (C7)

$R_b/R_c=3.27$ (C8)

$R_b/R_a=3.66$ (C9)

$v_{Ga}-v_{Gb}=65.09$ (C10)

$L_{23}/f_{12}=0.43$ (C11)

$f_1/f_{12}=0.84$ (C12)

Figure 6:
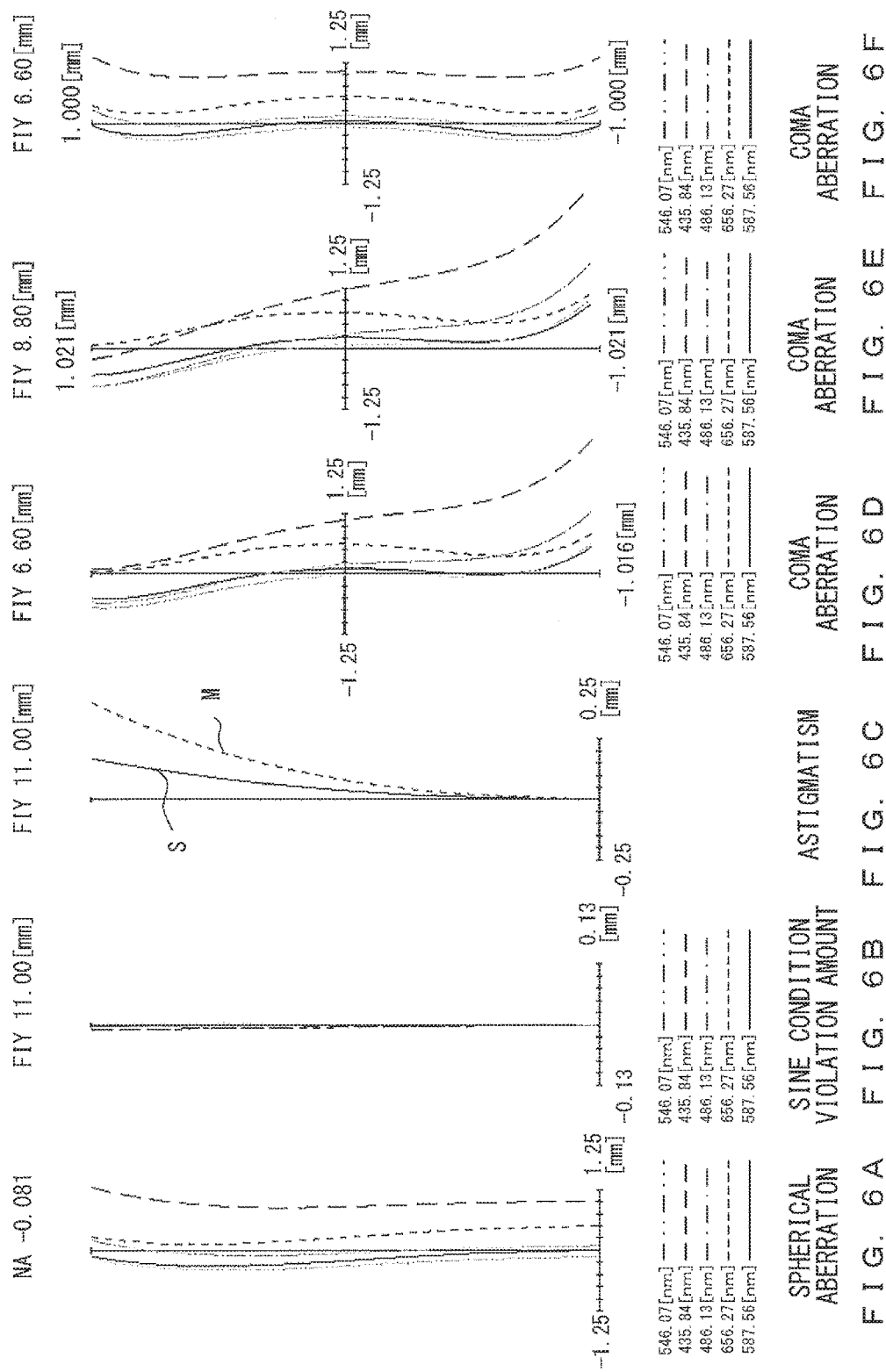
FIG. 6A through FIG. 6F are aberration diagrams of the relay optical system according to example 3 of the present invention.

FIG. 6A through FIG. 6F are aberration diagrams of the relay optical system 3 according to the present example, and show aberrations on the secondary imaging plane. FIG. 6A is a spherical aberration diagram, FIG. 6B is a diagram showing a sine condition violation amount, FIG. 6C is a diagram showing an astigmatism. FIG. 6D is a diagram showing the Y-directional coma aberration at the position with the image height ratio of 0.6, FIG. 6E is a diagram showing the Y-directional coma aberration at the position with the image height ratio of 0.8, and FIG. 6F is a diagram showing the X-directional coma aberration at the position with the image height ratio of 0.6. It is shown that the aberration in each state is corrected well.

Example 4

Figure 7:
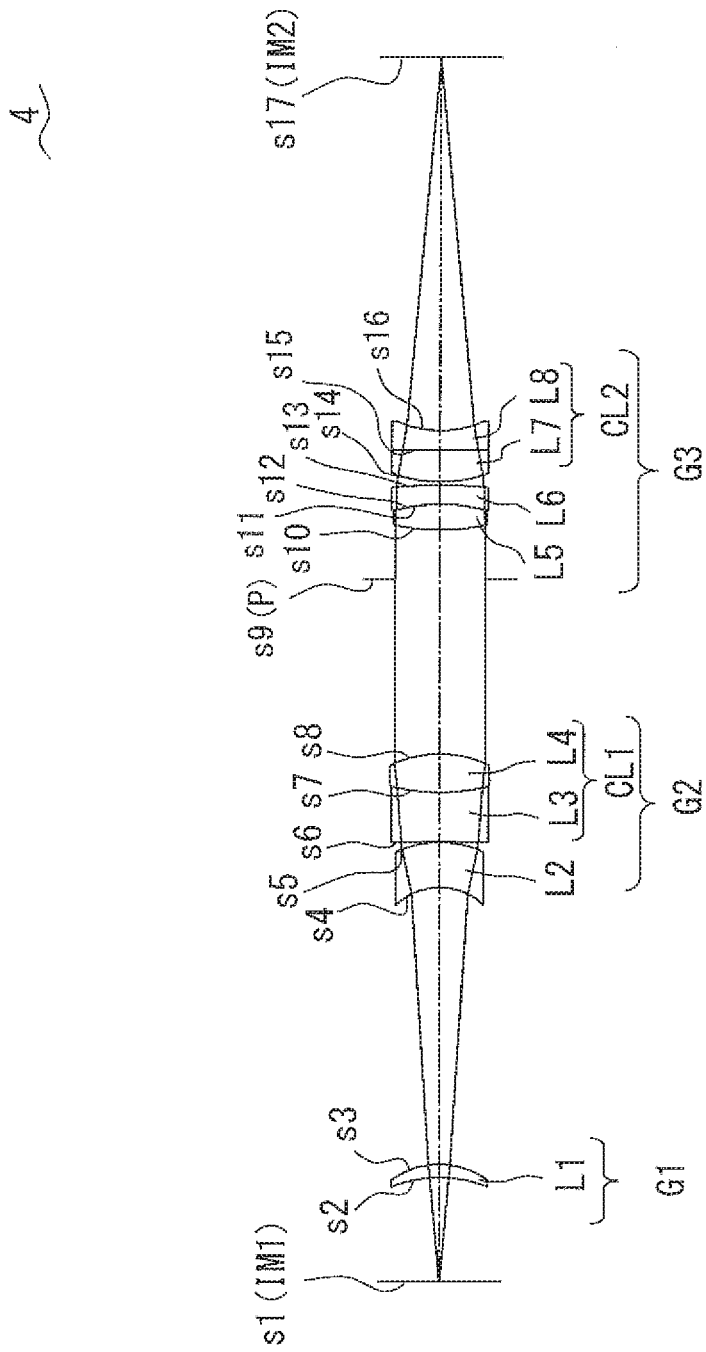
FIG. 7 is a sectional view showing the lens configuration of a relay optical system according to example 4 of the present invention.

FIG. 7 is a sectional view showing the lens configuration of a relay optical system 4 according to the present example. In the relay optical system 4, exit pupil position P of the optical system consisting of first lens group G1 and second lens group G2 is located between second lens group G2 and third lens group G3.

First lens group G1 includes a meniscus lens (lens L1) that is a single lens with positive power and that has the concave surface facing toward the object. Second lens group G2 includes, in the order from the object side, a meniscus lens (lens L2) with negative power having the concave surface facing toward the object and cemented lens CL1 consisting of a biconcave lens (lens L3) and a biconvex lens (lens L4).

Third lens group G3 includes, in the order from the object side, the 3-1st lens group with positive power and the 3-2nd lens group with negative power. The 3-1st lens group includes, in the order from the object side, a biconvex lens (lens L5) with positive power and a meniscus lens (lens L6) with negative power having the concave surface facing toward the object. The 3-2nd lens group includes cemented lens CL2, and cemented lens CL2 includes, in the order from the object side, a planoconvex lens (lens L7) having the convex surface facing toward the object and a planoconcave lens (lens L8) having the planar surface facing toward the object.

Hereinafter, data of the relay optical system 4 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, focal length $f_3$ of third lens group G3 (i.e., the combined focal length of the 3-1st lens group and the 3-2nd lens group), focal length $f_{3\text{-}1}$ of the 3-1st lens group and focal length $f_{3\text{-}2}$ of the 3-2nd lens group are as below.

NA=0.08β=1.0
$f_1$=129.89 mm
$f_2$=224.55 mm
$f_3$=156.59 mm
$f_{12}$=156.65 mm
$f_{3\text{-}1}$=159.17 mm
$f_{3\text{-}2}$=−832.6 mm The lens data of the relay optical system 4 is as below.

| Relay optical system 4 | | | | |
|---|---|---|---|---|
| s | r | d | nd | vd |
| s1(IM1) | INF | 32.55 | 1 | |
| s2 | −42.7747 | 4.10 | 1.51633 | 64.14 |
| s3 | −26.9698 | 86.46 | 1 | |
| s4 | −20.8613 | 14.15 | 1.67003 | 47.23 |
| s5 | −34.3909 | 0.10 | 1 | |
| s6 | −1261.8995 | 15.54 | 1.65412 | 39.68 |
| s7 | 69.053 | 11.93 | 1.43875 | 94.93 |
| s8 | −38.1823 | 54.58 | 1 | |
| s9 | INF | 15.42 | 1 | |
| s10 | 72.7056 | 8.00 | 1.43875 | 94.93 |
| s11 | −56.1412 | 0.00 | 1 | |
| s12 | −55.7831 | 6.00 | 1.6134 | 44.27 |
| s13 | −176.4717 | 1.00 | 1 | |
| s14 | 45.527 | 10.00 | 1.7859 | 44.2 |
| s15 | INF | 6.00 | 1.741 | 52.64 |
| s16 | 33.8668 | 116.50 | 1 | |
| s17(IM2) | INF | 0.00 | 1 | |

In the present example, surface numbers s1 and s17 represent the primary imaging plane and the secondary imaging plane, respectively, and surface numbers s2 and s16 represent the first surface and the last surface in the relay optical system 4, respectively. Surface number s9 represents the exit pupil position.

The relay optical system 4 according to the present example satisfies condition expressions (1) through (12) as represented by expressions (D1) through (D12) below. Note that expressions (D1) through (D12) correspond to condition expressions (1) through (12), respectively.

$f_1/d_1=3.99$ (D1)

$\exp_{12}/f_{12}=0.35$ (D2)

$M \times nd_{G2}/|R_2|=1.13$ (D3)

$v_{G1}=64.14$ (D4)

$v_{G2}=94.93$ (D5)

$\exp_{123}/f_3=-0.10$ (D6)

$f_{3\text{-}1}/f_{3\text{-}2}=-0.19$ (D7)

$R_b/R_c=3.88$ (D8)

$R_b/R_a=2.43$ (D9)

$v_{Ga}-v_{Gb}=50.66$ (D10)

$L_{23}/f_{12}=0.45$ (D11)

$f_1/f_{12}=0.83$ (D12)

Figure 8:
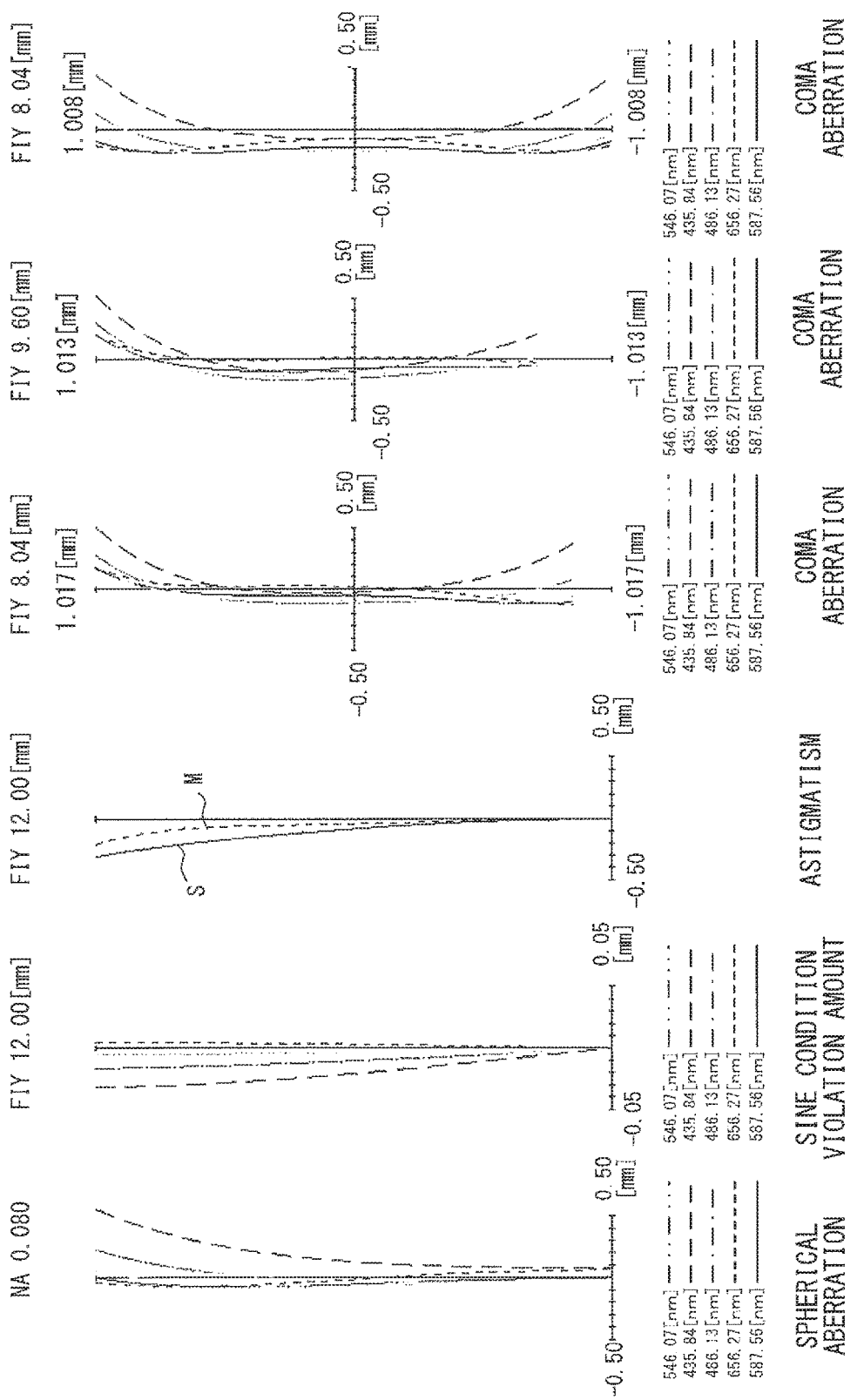
FIG. 8A through FIG. 8F are aberration diagrams of the relay optical system according to example 4 of the present invention.

FIG. 8A through FIG. 8F are aberration diagrams of the relay optical system 4 according to the present example, and show aberrations on the secondary imaging plane. FIG. 8A is a spherical aberration diagram, FIG. 8B is a diagram showing a sine condition violation amount, FIG. 8C is a diagram showing an astigmatism. FIG. 8D is a diagram showing the Y-directional coma aberration at the position with the image height ratio of 0.67, FIG. 8E is a diagram showing the Y-directional coma aberration at the position with the image height ratio of 0.8, and FIG. 8F is a diagram showing the X-directional coma aberration at the position with the image height ratio of 0.67. It is shown that the aberration in each state is corrected well.

Example 5

Figure 9:
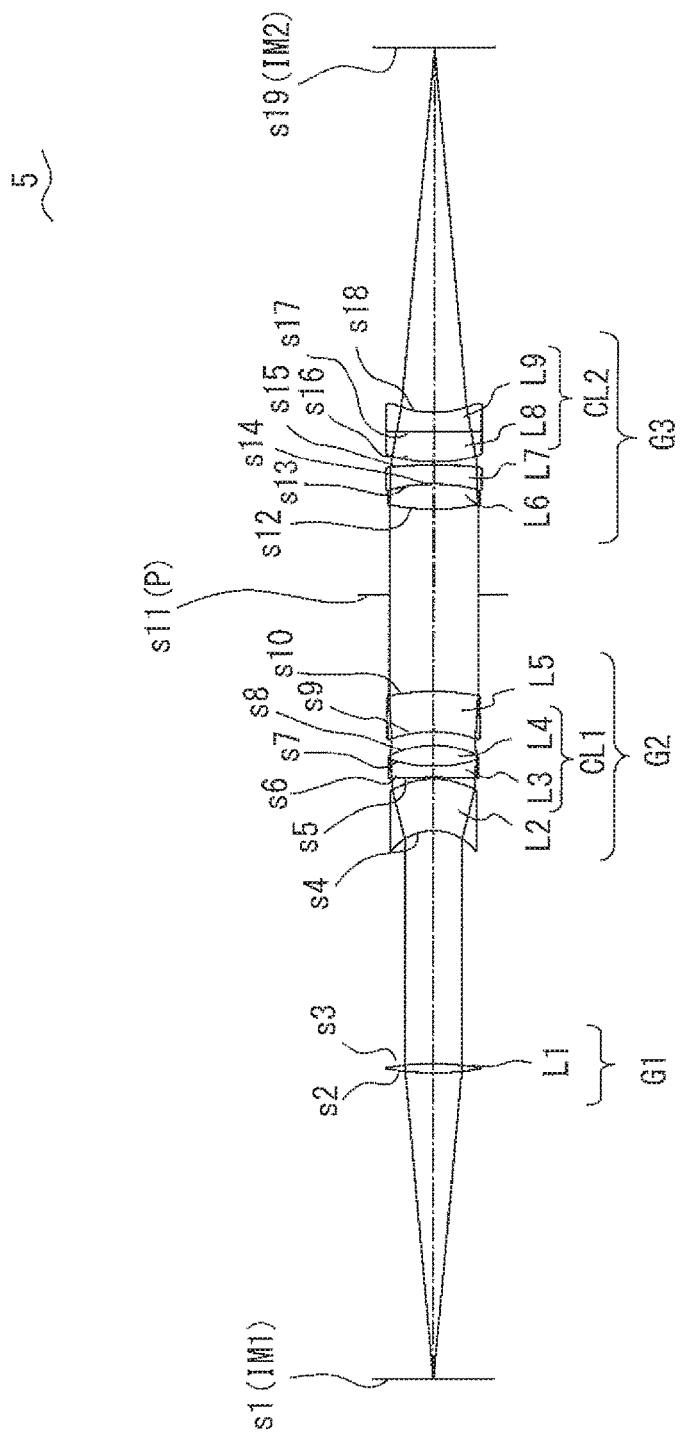
FIG. 9 is a sectional view showing the lens configuration of a relay optical system according to example 5 of the present invention.

FIG. 9 is a sectional view showing the lens configuration of a relay optical system 5 according to the present example. In the relay optical system 5, exit pupil position P of the optical system consisting of first lens group G1 and second lens group G2 is located between second lens group G2 and third lens group G3.

First lens group G1 includes a biconvex lens (lens L1) that is a single lens. Second lens group G2 includes, in the order from the object side, a meniscus lens (lens L2) with negative power having the concave surface facing toward the object, cemented lens CL1 consisting of a biconcave lens (lens L3) and a biconvex lens (lens L4), and a meniscus lens (lens L5) with negative power having the concave surface facing toward the object.

Third lens group G3 includes, in the order from the object side, the 3-1st lens group with positive power and the 3-2nd lens group with negative power. The 3-1st lens group includes, in the order from the object side, a biconvex lens (lens L6) with positive power and a meniscus lens (lens L7) with negative power having the concave surface facing toward the object. The 3-2nd lens group includes cemented lens CL2, and cemented lens CL2 includes, in the order from the object side, a planoconvex lens (lens L8) having the convex surface facing toward the object and a planoconcave lens (lens L9) having the planar surface facing toward the object.

Hereinafter, data of the relay optical system 5 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08β=1.0
$f_1$=101.799 mm
$f_2$=5694.63 mm
$f_3$=156.586 mm
$f_{12}$=156.799 mm
$f_{3-1}$=159.169 mm
$f_{3-2}$=−832.58 mm

The lens data of the relay optical system 5 is as below.

| Relay optical system 5 | | | | |
|---|---|---|---|---|
| s | r | d | nd | vd |
| s1(IM1) | INF | 97.83 | 1 | |
| s2 | 91.6079 | 3.00 | 1.43875 | 94.93 |
| s3 | −86.2899 | 74.37 | 1 | |
| s4 | −18.0627 | 16.48 | 1.8061 | 40.92 |
| s5 | −28.7029 | 0.50 | 1 | |
| s6 | −310.1102 | 3.61 | 1.6134 | 44.27 |
| s7 | 48.8016 | 6.82 | 1.43875 | 94.93 |
| s8 | −32.1831 | 4.37 | 1 | |
| s9 | −42.7554 | 12.89 | 1.51633 | 64.14 |
| s10 | −76.1126 | 25.09 | 1 | |
| s11 | INF | 32.91 | 1 | |

| Relay optical system 5 -continued | | | | |
|---|---|---|---|---|
| s | r | d | nd | vd |
| s12 | 72.7056 | 8.00 | 1.43875 | 94.93 |
| s13 | −56.1412 | 0.01 | 1 | |
| s14 | −55.7831 | 6.00 | 1.6134 | 44.27 |
| s15 | −176.4717 | 1.00 | 1 | |
| s16 | 45.527 | 10.00 | 1.7859 | 44.2 |
| s17 | INF | 6.00 | 1.741 | 52.64 |
| s18 | 33.8668 | 116.58 | 1 | |
| s19(IM2) | INF | 0.00 | | |

In the present example, surface numbers s1 and s19 represent the primary imaging plane and the secondary imaging plane, respectively, and surface numbers s2 and s18 represent the first surface and the last surface in the relay optical system 5, respectively. Surface number s11 represents the exit pupil position.

The relay optical system 5 according to the present example satisfies condition expressions (1) through (12) as represented by expressions (E1) through (E12) below. Note that expressions (E1) through (E12) correspond to condition expressions (1) through (12), respectively.

$f_1/d_1$=1.04 (E1)

$\exp_{12}/f_{12}$=0.16 (E2)

$M \times nd_{G2}/|R_2|$=1.65 (E3)

$v_{G1}$=94.93 (E4)

$v_{G2}$=94.93 (E5)

$\exp_{123}/f_3$=−0.38 (E6)

$f_{3-1}/f_{3-2}$=−0.19 (E7)

$R_b/R_c$=3.88 (E8)

$R_b/R_a$=2.43 (E9)

$v_{Ga}-v_{Gb}$=50.66 (E10)

$L_{23}/f_{12}$=0.54 (E11)

$f_1/f_{12}$=0.65 (E12)

Figure 10:
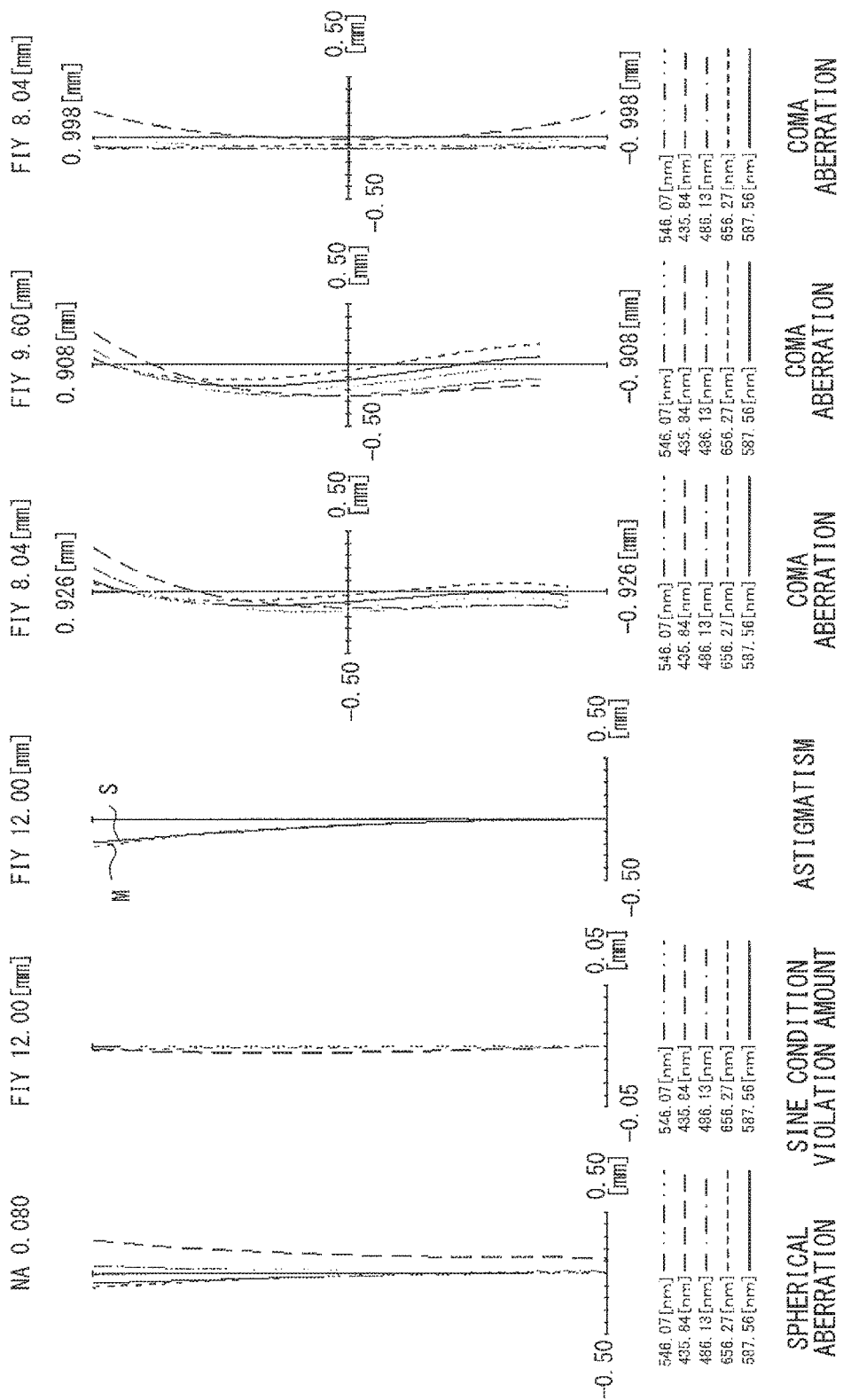
FIG. 10A through FIG. 10F are aberration diagrams of the relay optical system according to example 5 of the present invention.

FIG. 10A through FIG. 10F are aberration diagrams of the relay optical system 5 according to the present example, and show aberrations on the secondary imaging plane. FIG. 10A is a spherical aberration diagram, FIG. 10B is a diagram showing a sine condition violation amount, FIG. 10C is a diagram showing an astigmatism. FIG. 10D is a diagram showing the Y-directional coma aberration at the position with the image height ratio of 0.67, FIG. 10E is a diagram showing the Y-directional coma aberration at the position with the image height ratio of 0.8, and FIG. 10F is a diagram showing the X-directional coma aberration at the position with the image height ratio of 0.67. It is shown that the aberration in each state is corrected well.

Example 6

Figure 11:
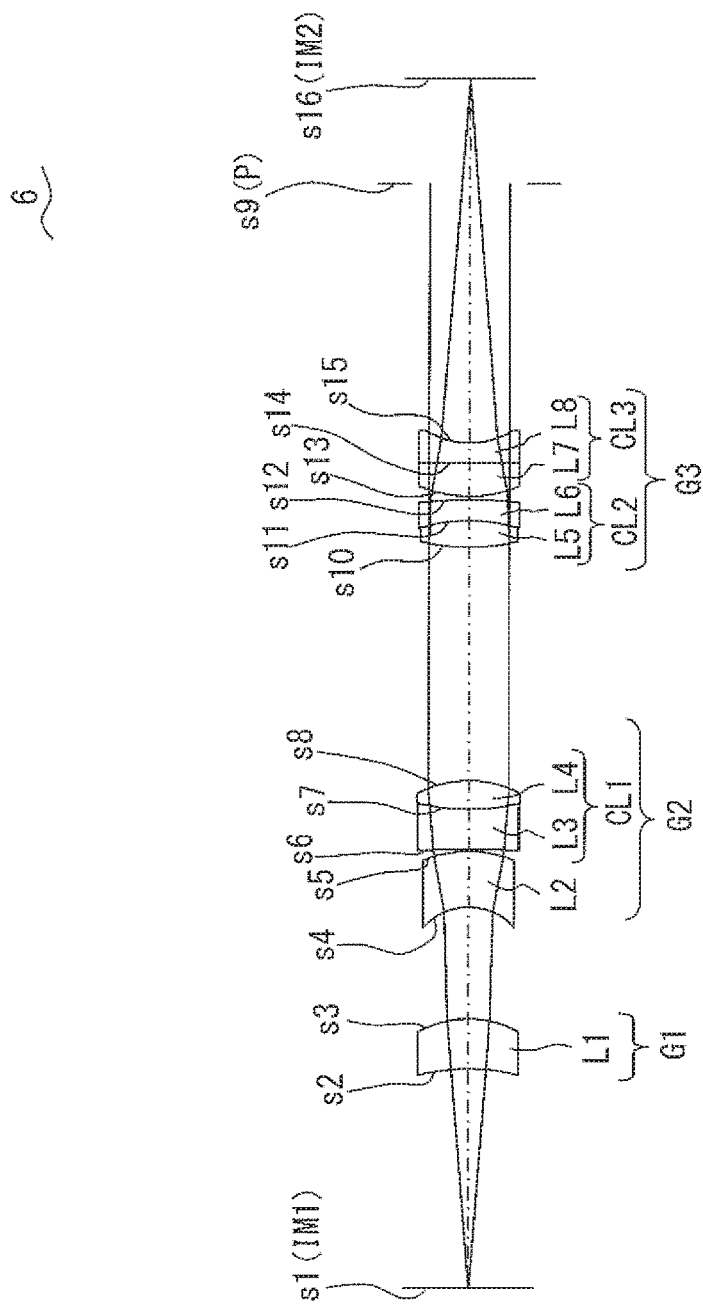
FIG. 11 is a sectional view showing the lens configuration of a relay optical system according to example 6 of the present invention.

FIG. 11 is a sectional view showing the lens configuration of a relay optical system 6 according to the present example. In the relay optical system 6, differently from the above examples, exit pupil position P of the optical system consisting of first lens group G1 and second lens group G2 is located between third lens group G3 and the secondary imaging plane.

First lens group G1 includes a meniscus lens (lens L1) that is a single lens with positive power and that has the concave surface facing toward the object. Second lens group G2 includes, in the order from the object side, a meniscus lens (lens L2) with negative power having the concave surface facing toward the object and cemented lens CL1 consisting of a biconcave lens (lens L3) and a biconvex lens (lens L4).

Third lens group G3 includes, in the order from the object side, the 3-1st lens group with positive power and the 3-2nd lens group with negative power. The 3-1st lens group includes cemented lens CL2, and cemented lens CL2 includes, in the order from the object side, a biconvex lens (lens L5) with positive power and a meniscus lens (lens L6) with negative power having the concave surface facing toward the object. The 3-2nd lens group includes cemented lens CL3, and cemented lens CL3 includes, in the order from the object side, a planoconvex lens (lens L7) having the convex surface facing toward the object and a planoconcave lens (lens L8) having the planar surface facing toward the object.

Hereinafter, data of the relay optical system 6 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, the focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08 β=1.0
$f_1$=129.47 mm
$f_2$=446.87 mm
$f_3$=156.5 mm
$f_{12}$=156.34 mm
$f_{3-1}$=131.12 mm
$f_{3-2}$=−293.7 mm

The lens data of the relay optical system 6 is as below.

| Relay optical system 6 | | | | |
|---|---|---|---|---|
| s | r | d | nd | νd |
| s1(IM1) | INF | 65.89 | 1 | |
| s2 | −65.5127 | 15.00 | 1.45852 | 67.83 |
| s3 | −33.3857 | 33.50 | 1 | |
| s4 | −19.3051 | 16.67 | 1.8061 | 40.92 |
| s5 | −39.3033 | 0.50 | 1 | |
| s6 | −1044.0235 | 12.33 | 1.6134 | 44.27 |
| s7 | 67.8995 | 8.64 | 1.43875 | 94.93 |
| s8 | −34.8335 | 179.11 | 1 | |
| s9 | INF | −109.10 | 1 | |
| s10 | 59.2425 | 8.05 | 1.43875 | 94.93 |
| s11 | −53.3221 | 6.00 | 1.6134 | 44.27 |
| s12 | −171.9572 | 1.03 | 1 | |
| s13 | 39.9633 | 10.03 | 1.7859 | 44.2 |
| s14 | INF | 6.02 | 1.741 | 52.64 |
| s15 | 26.3873 | 109.27 | 1 | |
| s16(IM2) | INF | 0.00 | | |

In the present example, surface numbers s1 and s16 represent the primary imaging plane and the secondary imaging plane, respectively, and surface numbers s2 and s15 represent the first surface and the last surface in the relay optical system 6, respectively. Surface number s9 represents the exit pupil position.

The relay optical system 6 according to the present example satisfies condition expressions (1) through (12) as represented by expressions (F1) through (F12) below. Note that expressions (F1) through (F12) correspond to condition expressions (1) through (12), respectively.

$$f_1/d_1=1.96 \tag{F1}$$

$$\exp_{12}/f_{12}=1.15 \tag{F2}$$

$$M \times nd_{G2}/|R_2|=1.56 \tag{F3}$$

$$\nu_{G1}=67.83 \tag{F4}$$

$$\nu_{G2}=94.93 \tag{F5}$$

$$\exp_{123}/f_3=0.70 \tag{F6}$$

$$f_{3-1}/f_{3-2}=-0.45 \tag{F7}$$

$$R_b/R_c=4.30 \tag{F8}$$

$$R_b/R_a=2.90 \tag{F9}$$

$$\nu_{Ga}-\nu_{Gb}=50.66 \tag{F10}$$

$$L_{23}/f_{12}=0.45 \tag{F11}$$

$$f_1/f_{12}=0.83 \tag{F12}$$

FIG. 12A through FIG. 12F are aberration diagrams of the relay optical system 6 according to the present example, and show aberrations on the secondary imaging plane. FIG. 12A is a spherical aberration diagram, FIG. 12B is a diagram showing a sine condition violation amount, FIG. 12C is a diagram showing an astigmatism. FIG. 12D is a diagram showing the Y-directional coma aberration at the position with the image height ratio of 0.67, FIG. 12E is a diagram showing the Y-directional coma aberration at the position with the image height ratio of 0.8, and FIG. 12F is a diagram showing the X-directional coma aberration at the position with the image height ratio of 0.67. It is shown that the aberration in each state is corrected well.

Example 7

FIG. 13 is a sectional view showing the lens configuration of a relay optical system 7 according to the present example. In the relay optical system 7, exit pupil position P of the optical system consisting of first lens group G1 and second lens group G2 is located in third lens group G3.

First lens group G1 includes a meniscus lens (lens L1) that is a single lens with positive power and that has the concave surface facing toward the object. Second lens group G2 includes, in the order from the object side, a meniscus lens (lens L2) with negative power having the concave surface facing toward the object and cemented lens CL1 consisting of a meniscus lens (lens L3) with negative power having the convex surface facing toward the object and a biconvex lens (lens L4).

Third lens group G3 includes, in the order from the object side, the 3-1st lens group with positive power and the 3-2nd lens group with negative power. The 3-1st lens group includes cemented lens CL2, and cemented lens CL2 includes, in the order from the object side, a biconvex lens (lens L5) with positive power and a meniscus lens (lens L6) with negative power having the concave surface facing toward the object. The 3-2nd lens group includes cemented lens CL3, and cemented lens CL3 includes, in the order from the object side, a planoconvex lens (lens L7) having the convex surface facing toward the object and a planoconcave lens (lens L8) having the planar surface facing toward the object.

Hereinafter, data of the relay optical system 7 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, the focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08β=1.0
$f_1$=164.7 mm
$f_2$=330.2 mm
$f_3$=156.7 mm
$f_{12}$=156.5 mm
$f_{3-1}$=100.1 mm
$f_{3-2}$=−177 mm

The lens data of the relay optical system 7 is as below.

| Relay optical system 7 | | | | |
|---|---|---|---|---|
| s | r | d | nd | νd |
| s1(IM1) | INF | 81.00 | 1 | |
| s2 | −797.8562 | 7.59 | 1.45852 | 67.83 |
| s3 | −69.2105 | 77.00 | 1 | |
| s4 | −42.8875 | 15.48 | 1.8061 | 40.92 |
| s5 | −61.0692 | 0.50 | 1 | |
| s6 | 470.0948 | 9.91 | 1.65412 | 39.68 |
| s7 | 94.8706 | 7.96 | 1.43875 | 94.93 |
| s8 | −69.7167 | 82.19 | 1 | |
| s9 | INF | −12.19 | 1 | |
| s10 | 38.3528 | 10.00 | 1.43875 | 94.93 |
| s11 | −55.3767 | 10.54 | 1.6134 | 44.27 |
| s12 | −365.8312 | 0.10 | 1 | |
| s13 | 32.6608 | 5.00 | 1.7859 | 44.2 |
| s14 | INF | 1.92 | 1.741 | 52.64 |
| s15 | 22.5964 | 116.48 | 1 | |
| s16(IM2) | INF | 0.00 | | |

In the present example, surface numbers s1 and s16 represent the primary imaging plane and the secondary imaging plane, respectively, and surface numbers s2 and s15 represent the first surface and the last surface in the relay optical system, respectively. Surface number s9 represents the exit pupil position.

The relay optical system 7 according to the present example satisfies condition expressions (1) through (12) as represented by expressions (G1) through (G12) below. Note that expressions (G1) through (G12) correspond to condition expressions (1) through (12), respectively.

$f_1/d_1$=2.03 (G1)

$\exp_{12}/f_{12}$=0.53 (G2)

$M \times nd_{G2}/|R_2|$=0.65 (G3)

$\nu_{G1}$=67.83 (G4)

$\nu_{G2}$=94.93 (G5)

$\exp_{123}/f_3$=0.08 (G6)

$f_{3-1}/f_{3-2}$=−0.57 (G7)

$R_b/R_c$=11.20 (G8)

$R_b/R_a$=9.54 (G9)

$\nu_{Ga}-\nu_{Gb}$=50.66 (G10)

$L_{23}/f_{12}$=0.45 (G11)

$f_1/f_{12}$=1.05 (G12)

FIG. 14A through FIG. 14F are aberration diagrams of the relay optical system 7 according to the present example, and show aberrations on the secondary imaging plane. FIG. 14A is a spherical aberration diagram, FIG. 14B is a diagram showing a sine condition violation amount, FIG. 14C is a diagram showing an astigmatism. FIG. 14D is a diagram showing the Y-directional coma aberration at the position with the image height ratio of 0.67, FIG. 14E is a diagram showing the Y-directional coma aberration at the position with the image height ratio of 0.8, and FIG. 14F is a diagram showing the X-directional coma aberration at the position with the image height ratio of 0.67. It is shown that the aberration in each state is corrected well.

Example 8

Figure 15:
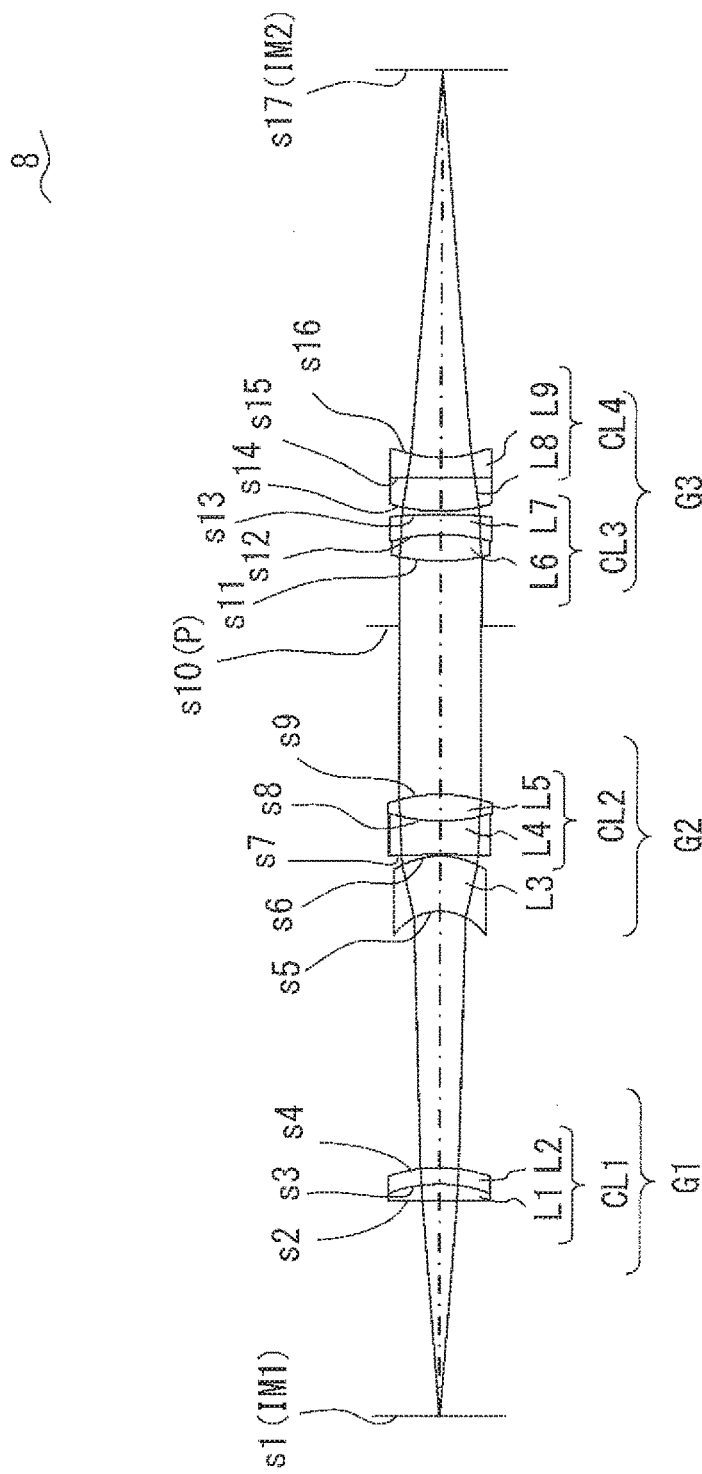
FIG. 15 is a sectional view showing the lens configuration of a relay optical system according to example 8 of the present invention.

FIG. 15 is a sectional view showing the lens configuration of a relay optical system 8 according to the present example. In the relay optical system 8, exit pupil position P of the optical system consisting of first lens group G1 and second lens group G2 is located between second lens group G2 and third lens group G3.

First lens group G1 includes cemented lens CL1, and cemented lens CL1 consists of, in the order from the object side, a meniscus lens (lens L1) with positive power having the concave surface facing toward the object and a meniscus lens (lens L2) with negative power having the concave surface facing toward the object.

Second lens group G2 includes, in the order from the object side, a meniscus lens (lens L3) with negative power having the concave surface facing toward the object and cemented lens CL2 consisting of a biconcave lens (lens L4) and a biconvex lens (lens L5).

Third lens group G3 includes, in the order from the object side, the 3-1st lens group with positive power and the 3-2nd lens group with negative power. The 3-1st lens group includes cemented lens CL3, and cemented lens CL3 includes, in the order from the object side, a biconvex lens (lens L6) with positive power and a meniscus lens (lens L7) with negative power having the concave surface facing toward the object. The 3-2nd lens group includes cemented lens CL4, and cemented lens CL4 includes, in the order from the object side, a planoconvex lens (lens L8) having the convex surface facing toward the object and a planoconcave lens (lens L9) having the planar surface facing toward the object.

Hereinafter, data of the relay optical system 8 according to the present example will be explained.

Numerical aperture NA on the image side (side of secondary image IM2), focal length $f_1$ of first lens group G1, focal length $f_2$ of second lens group G2, combined focal length $f_{12}$ of first lens group G1 and second lens group G2, the focal length $f_3$ of third lens group G3 (i.e., the combined focal length of the 3-1st lens group and the 3-2nd lens group), focal length $f_{3-1}$ of the 3-1st lens group and focal length $f_{3-2}$ of the 3-2nd lens group are as below.

NA=0.08β=1.0
$f_1$=110.8 mm
$f_2$=453.2 mm
$f_3$=156.5 mm $f_{12}=156.5$ mm
$f_{3-1}=125.4$ mm
$f_{3-2}=-310$ mm

The lens data of the relay optical system 8 is as below.

| Relay optical system 8 | | | | |
|---|---|---|---|---|
| s | r | d | nd | vd |
| s1(IM1) | INF | 64.61 | 1 | |
| s2 | −577.5053 | 5.00 | 1.497 | 81.54 |
| s3 | −44.6177 | 4.92 | 1.65412 | 39.68 |
| s4 | −49.518 | 77.00 | 1 | |
| s5 | −17.3924 | 16.54 | 1.8061 | 40.92 |
| s6 | −26.3387 | 0.50 | 1 | |
| s7 | −305.9676 | 10.12 | 1.65412 | 39.68 |
| s8 | 56.2914 | 7.95 | 1.43875 | 94.93 |
| s9 | −49.1772 | 50.48 | 1 | |
| s10 | INF | 19.52 | 1 | |
| s11 | 61.8189 | 8.00 | 1.43875 | 94.93 |
| s12 | −58.1592 | 6.00 | 1.6134 | 44.27 |
| s13 | −154.0789 | 1.00 | 1 | |
| s14 | 55.4299 | 10.00 | 1.7859 | 44.2 |
| s15 | INF | 6.00 | 1.741 | 52.64 |
| s16 | 37.1094 | 116.45 | 1 | |
| s17(IM2) | INF | 0.00 | 1 | |

In the present example, surface numbers s1 and s17 represent the primary imaging plane and the secondary imaging plane, respectively, and surface numbers s2 and s16 represent the first surface and the last surface in the relay optical system 8, respectively. Surface number s10 represents the exit pupil position.

The relay optical system 8 according to the present example satisfies condition expressions (1) through (12) as represented by expressions (H1) through (H12) below. Note that expressions (H1) through (H12) correspond to condition expressions (1) through (12), respectively.

$f_1/d_1=1.70$ (H1)

$\exp_{12}/f_{12}=0.32$ (H2)

$M \times nd_{G2}/|R_2|=1.66$ (H3)

$\nu_{G1}=81.54$ (H4)

$\nu_{G2}=94.93$ (H5)

$\exp_{123}/f_3=-0.12$ (H6)

$f_{3-1}/f_{3-2}=-0.40$ (H7)

$R_b/R_c=2.78$ (H8)

$R_b/R_a=2.49$ (H9)

$\nu_{Ga}-\nu_{Gb}=50.66$ (H7)

$L_{23}/f_{12}=0.45$ (H11)

$f_1/f_{12}=0.71$ (H12)

Figure 16:
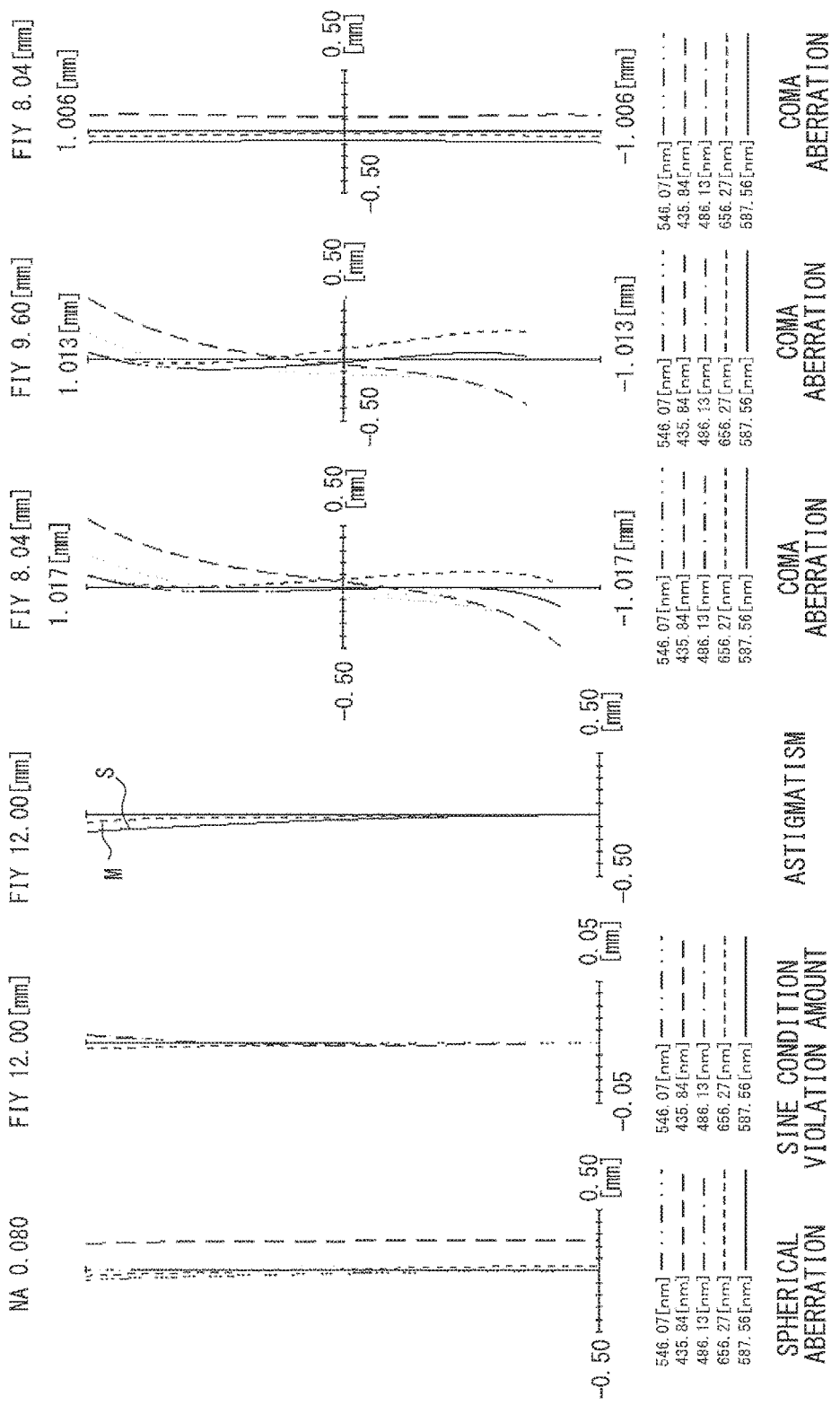
FIG. 16A through FIG. 16F are aberration diagrams of the relay optical system according to example 8 of the present invention.

FIG. 16A through FIG. 16F are aberration diagrams of the relay optical system 8 according to the present example, and show aberrations on the secondary imaging plane. FIG. 16A is a spherical aberration diagram, FIG. 16B is a diagram showing a sine condition violation amount, FIG. 16C is a diagram showing an astigmatism. FIG. 16D is a diagram showing the Y-directional coma aberration at the position with the image height ratio of 0.67, FIG. 16E is a diagram showing the Y-directional coma aberration at the position with the image height ratio of 0.8, and FIG. 16F is a diagram showing the X-directional coma aberration at the position with the image height ratio of 0.67. It is shown that the aberration in each state is corrected well.

Example 9

FIG. 17 exemplifies the configuration of a microscope apparatus 100 according to the present example. The microscope apparatus 100 is a fluorescence microscope apparatus that detects fluorescence output from sample SP held by sample holding member SH and obtains a fluorescence image of sample SP. The microscope apparatus 100 replaces a rotary disk of a disk scanning device 30 or inserts or removes it, and thereby can switch the observation method between the confocal fluorescence microscopy and the normal fluorescence microscopy.

The microscope apparatus 100 includes a light source unit 10, an image forming optical system 20, the disk scanning device 30 and a CCD (Charge Coupled Device) camera 40.

The light source unit 10 is a unit that provides excitation light for exciting sample SP, and includes a light source device 11, an optical fiber 12 and a connection unit 13 for connecting the light source unit 10 to the disk scanning device 30. The light source device 11 includes a light source that emits white light, the light source is for example a mercury lamp, a xenon lamp, etc.

The image forming optical system 20 is an optical system that forms an optical image (primary image IM1) of sample SP by condensing the fluorescence output from sample SP, and includes an objective 21, a tube lens 22 and a right angle prism 23. The objective 21 is held by a revolver (not shown), and is replaced with different objectives having different optical specifications (such as magnification etc.) to be used on an as-needed basis.

The CCD camera 40 is an image pickup device that picks up an image of sample SP. The CCD camera 40 includes a CCD 41 as an image pickup element.

The disk scanning device 30 is a device that is used in combination with the light source unit 10, the image forming optical system 20 and the CCD camera 40 and that is configured so that it can be detached from the microscope apparatus 100. The disk scanning device 30 includes a lens 31, a fluorescence mirror unit 32, a rotary disk 36, a mirror 37 and relay optical system RL.

The disk scanning device 30 is arranged in such a manner that a disk surface 36S of the rotary disk 36 is located on the focal plane of the image forming optical system 20 in which primary image IM1 of sample SP is formed.

The lens 31 is a lens that guides, to the fluorescence mirror unit 32, the while light emitted from the light source unit 10. The fluorescence mirror unit 32 selectively guides, to sample SP, light having an excitation wavelength (i.e., excitation light) from the while light, and also guides the fluorescence output from sample SP to the CCD camera 40. The fluorescence mirror unit 32 includes an excitation filter 33 that transmits the excitation light, a dichroic mirror 34, which is a light splitter unit for reflecting the excitation light and transmitting fluorescence (an optical-path splitter element) and a barrier filter 35 that blocks the excitation light.

The rotary disk 36 is configured to rotate on rotary axis AR that is orthogonal to the disk surface 36S by using a driving unit that is not shown (such a motor etc.). The disk surface 36S of the rotary disk 36 includes a light-blocking portion that blocks light and a transmission portion that transmits light. By removing the rotary disk 36 from the optical path, the observation method is switched from the confocal fluorescence microscopy to the normal fluorescence microscopy.

The mirror 37 is a deflecting mirror that deflects light in order to make the configuration of the disk scanning device 30 compact.

Relay optical system RL is a relay optical system for a microscope apparatus that relays an optical image (primary image IM1) of sample SP formed on the disk surface 36S to the CCD camera 40 so as to form a secondary image, and is for example the relay optical system in any of example 1 through example 8.

Relay optical system RL consists of, in the order from the side close to the rotary disk 36, front group FG with positive power and rear group RG with positive power, and is configured in such a manner that the light flux passing between front group FG and rear group RG is a substantially-parallel light flux. More specifically, relay optical system RL is configured in such a manner that the light that was output from sample SP and that was condensed onto the disk surface 36S by the image forming optical system 20 is a substantially-parallel light flux between from group FG and a rear group RG.

Front group FG of relay optical system RL includes, in the order from the side close to the rotary disk 36, first lens group G1 with positive power and second lens group G2 with positive power. Second lens group G2 includes, closest to the object, a lens having its concave surface facing toward the object. Also, the fluorescence mirror unit 32 is arranged between first lens group G1 and second lens group G2. Thereby, the excitation light emitted from the light source device 11 is guided to the rotary disk 36 by the fluorescence mirror unit 32 via first lens group G1. Rear group RG of relay optical system RL includes third lens group G3 with positive power. Relay optical system RL satisfies condition expressions (1) and (2).

In the microscope apparatus 100 configured as above, the white light that contains the excitation light emitted from the light source unit 10 is incident on the disk scanning device 30 and is guided to the fluorescence mirror unit 32 by the lens 31. In the fluorescence mirror unit 32, the excitation light is selected from the white light by the excitation filter 33 and the dichroic mirror 34, and the selected excitation light is guided to first lens group G1. First lens group G1 collimates the excitation light and irradiates the rotary disk 36 that rotates at a high speed with the excitation light. The excitation light having passed through the transmission portion of the rotary disk 36 is condensed onto the pupil position of the objective 21 by the right angle prism 23 and the tube lens 22, and thereafter sample SP is irradiated with the excitation light via the objective 21. Thereby, Kohler illumination is implemented. Note that the disk surface 36S and sample SP are in an optically conjugate relationship. Accordingly, the pattern of the transmission portion that varies as time elapses because of the rotation of the rotary disk 36 is projected on sample SP.

The fluorescence output from sample SP that was irradiated with the excitation light is incident on the image forming optical system 20. The image forming optical system 20 condenses the florescence so as to form primary image IM1 of sample SP on the disk surface 36S, which is the image-side focal plane of the image forming optical system 20. Out of the fluorescence forming primary image IM1, the fluorescence output from portions other than the focal plane of the objective 21 is incident on the light-blocking portion of the rotary disk 36 and is blocked by the light-blocking portion. The fluorescence that was output from the focal plane of the objective 21 and has passed through the transmission portion of the rotary disk 36 is incident on the fluorescence mirror unit 32 after passing through first lens group G1.

Excitation light reflected at sample SP, a lens, etc. is incident on fluorescence mirror unit 32 together with the fluorescence, but the excitation light having been incident on the fluorescence mirror unit 32 is blocked by the dichroic mirror 34 and the barrier filter 35. The fluorescence having passed through the fluorescence mirror unit 32 is incident on second lens group G2 and is converted into a substantially-parallel light flux so as to be emitted. Thereafter, the fluorescence is reflected by the mirror 37, and is incident on rear group RG as a substantially-parallel light flux. Rear group RG condenses the fluorescence onto the CCD 41 so as to form secondary image IM2. As the final stage, the CCD 41 converts the incident fluorescence into an electric signal so that the CCD camera 40 obtains a confocal fluorescence image of sample SP.

In the microscope apparatus 100, the rotary disk 36 located at a position optically-conjugate with the focal plane of the objective 21 rotates at a high speed, making it possible to conduct high speed scanning of sample SP located on the focal plane of the objective 21. Thereby, it is possible to speedily obtain a confocal fluorescence image with high contrast and resolution.

Also, in the microscope apparatus 100, it is possible to conduct the normal fluorescence microscopy by replacing the rotary disk 36 having a light-blocking portion with a disk not having a light-blocking portion or by removing the rotary disk 36 having a light-blocking portion. Accordingly, it is possible to switch the observation method between the confocal fluorescence microscopy and the normal fluorescence microscopy by performing a simple manipulation. This makes it possible to select appropriate observation methods. For example, when the operations in which the brightness of images are given priority is conducted or the visual observation using an eye piece is conducted, the normal fluorescence microscopy is selected. And when the image is obtained, the confocal fluorescence microscopy is selected.

Further, relay optical system RL is configured in such a manner that excellent optical performance can be maintained even with an optical-path splitter element having been inserted into the optical path. Accordingly, the microscope apparatus 100 can realize excellent optical performance.

The respective examples described above are specific examples for facilitating the understanding of the invention, and the scope of the present invention is not limited to these examples. The relay optical system allows various modifications and changes without departing from the present invention, which is defined in the claims. For example, the relay optical system of the present invention can preferably be applied also to a case where the magnification of the entire relay optical system is 0.9 times through 4 times and the numerical aperture is 0.05 or higher.

I claim:

1. A relay optical system for a microscope apparatus that relays a primary image of an object formed by an objective and a tube lens and that forms a secondary image, the relay optical system comprising in an order from an object side:
   a first lens group with positive power;
   a second lens group with positive power; and
   a third lens group with positive power, wherein
   the second lens group includes, closest to the object, a lens having a concave surface facing toward the object, and
   the relay optical system is configured in such a manner that a light flux passing between the second lens group and the third lens group is a substantially-parallel light flux, and satisfies condition expressions below, where $f_1$ represents a focal length of the first lens group, $d_1$ represents a length from the primary image to a surface closest to the object in the first lens group, $f_{12}$ represents a combined focal length of the first lens group and the second lens group, and $\exp_{12}$ represents a length from an exit pupil position of an optical system consisting of the first lens group and the second lens group to a surface closest to the object in the second lens group, the exit pupil position being calculated by a paraxial ray tracing:

$$1 \leq f_1/d_1 \leq 4.3$$

$$0.16 \leq \exp_{12}/f_{12} \leq 1.2.$$

2. The relay optical system according to claim 1, wherein the second lens group consists of at least three lenses, and includes a meniscus lens with negative power that consists of a single lens or a cemented lens and that has a concave surface facing toward the object, and the relay optical system satisfies a condition expression below, where M represents thickness of the meniscus lens, $nd_{G2}$ represents a refractive index of the lens closest to the object in the second lens group with respect to d-line, and $R_2$ represents a curvature radius of a concave surface closest to the object in the second lens group:

$$0.5 \leq M \times nd_{G2}/|R_2| \leq 2.$$

3. The relay optical system according to claim 1, wherein the relay optical system satisfies condition expressions below, where $\nu_{G1}$ represents Abbe number of a lens with smallest Abbe number among lenses with positive power that constitute the first lens group and $\nu_{G2}$ represents Abbe number of a lens with smallest Abbe number among lenses with positive power that constitute the second lens group:

$$60 \leq \nu_{G1}$$

$$60 \leq \nu_{G2}.$$

4. The relay optical system according to claim 1, wherein the third lens group includes in an order from an object side:

a 3-1st lens group that is a lens group with positive power; and a 3-2nd lens group that is a lens group with negative power and that consists of one cemented lens or a single lens, the relay optical system satisfies a condition expression below, where $f_3$ represents a combined focal length of the 3-1st lens group and the 3-2nd lens group and $\exp_{123}$ represents a length from the exit pupil position of an optical system consisting of the first lens group and the second lens group to a surface closest to the object in the third lens group:

$$-0.5 \leq \exp_{123}/f_3 \leq 0.7, \text{ and}$$

$\exp_{123}$ has a positive value when the exit pupil position is on an object side with respect to the surface closest to the object and has a negative value when the exit pupil position is on an image side with respect to the surface.

5. The relay optical system according to claim 4, wherein the relay optical system satisfies condition expressions below, where $f_{3-1}$ represents a focal length of the 3-1st lens group and $f_{3-2}$ represents a focal length of the 3-2nd lens group, $R_a$ represents a curvature radius of a surface closest to the object in the 3-1st lens group, $R_b$ represents a curvature radius of a surface closest to an image in the 3-1st lens group, and $R_c$ represents a curvature radius of a surface closest to the object in the 3-2nd lens group:

$$-0.8 \leq f_{3-1}/f_{3-2} \leq -0.1$$

$$2 \leq R_b/R_c \leq 13$$

$$1.5 \leq R_b/R_a \leq 12, \text{ and}$$

$R_a$, $R_b$ and $R_c$ have positive values when the surface is a convex surface and have negative values when the surface is a concave surface.

6. The relay optical system according to claim 4, wherein the third lens group consists of at least four lenses, and includes a cemented lens.

7. The relay optical system according to claim 4, wherein the 3-1st lens group consists of in an order from an object side:

a lens with positive power that has Abbe number $\nu_{Ga}$, and a lens with negative power that has Abbe number $\nu_{Gb}$, and the relay optical system satisfies a condition expression below:

$$\nu_{Ga} - \nu_{Gb} \geq 30.$$

8. The relay optical system according to claim 1, wherein a condition expression below is satisfied, where $L_{23}$ represents a length between the second lens group and the third lens group:

$$0.2 \leq L_{23}/f_{12} \leq 1.$$

9. The relay optical system according to claim 1, wherein a condition expression below is satisfied:

$$0.4 \leq f_1/f_{12} \leq 1.5.$$

10. A microscope apparatus comprising the relay optical system according to claim 1.

* * * * *